(12) United States Patent
Sano

(10) Patent No.: US 6,285,853 B1
(45) Date of Patent: Sep. 4, 2001

(54) TWO-SIDED READING-OUT APPARATUS AND AN IMAGE FORMING APPARATUS

(75) Inventor: Motoya Sano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/551,619

(22) Filed: Apr. 17, 2000

(30) Foreign Application Priority Data

Apr. 15, 1999 (JP) .................................................. 11-107354
Mar. 1, 2000 (JP) .................................................. 12-072653

(51) Int. Cl.[7] ............................. G03G 15/00; H04N 1/04
(52) U.S. Cl. .......................... 399/374; 358/496; 399/17; 399/82
(58) Field of Search ................................ 399/17, 374, 82, 399/85; 358/474, 496, 497; 271/8.1, 225, 902

(56) References Cited

U.S. PATENT DOCUMENTS

| | | | |
|---|---|---|---|
| 4,536,077 | * | 8/1985 | Stoffel .................................. 358/497 |
| 5,463,451 | * | 10/1995 | Acquaviva et al. ............. 358/496 X |
| 5,915,159 | * | 6/1999 | Okada ................................ 399/374 X |

FOREIGN PATENT DOCUMENTS

| | | |
|---|---|---|
| 1-194658 | 8/1989 | (JP) . |
| 2-306762 | 12/1990 | (JP) . |
| 5-303246 | 11/1993 | (JP) . |
| 6-026416 | 4/1994 | (JP) . |
| 7-110641 | 4/1995 | (JP) . |
| 9-046472 | 2/1997 | (JP) . |
| 9-046483 | 2/1997 | (JP) . |
| 9-046484 | 2/1997 | (JP) . |
| 11-069087 | 3/1999 | (JP) . |

* cited by examiner

Primary Examiner—Sophia S. Chen
(74) Attorney, Agent, or Firm—Oblon, Spivak, McClelland, Maier & Neustadt, P.C.

(57) ABSTRACT

A two-sided reading-out apparatus and an image forming apparatus including the two-sided reading-out apparatus are capable of simplifying processing at a time of reading out the image respectively for one-side surface reading-out and two-side surface reading-out in an original document, preventing the large-sizing of the apparatus, and avoiding the cost run-up thereof, thereby securing optimum productivity. A first document conveying path extends from a document stand to a contact glass and a second document conveying path extends from the contact glass to a document discharging tray via a fixed reading-out section. The direction of conveying the document is changed over by a changing-over claw. Thus, the image data on the front and rear sides of both surfaces of the document can be read out without being overlapped.

86 Claims, 20 Drawing Sheets

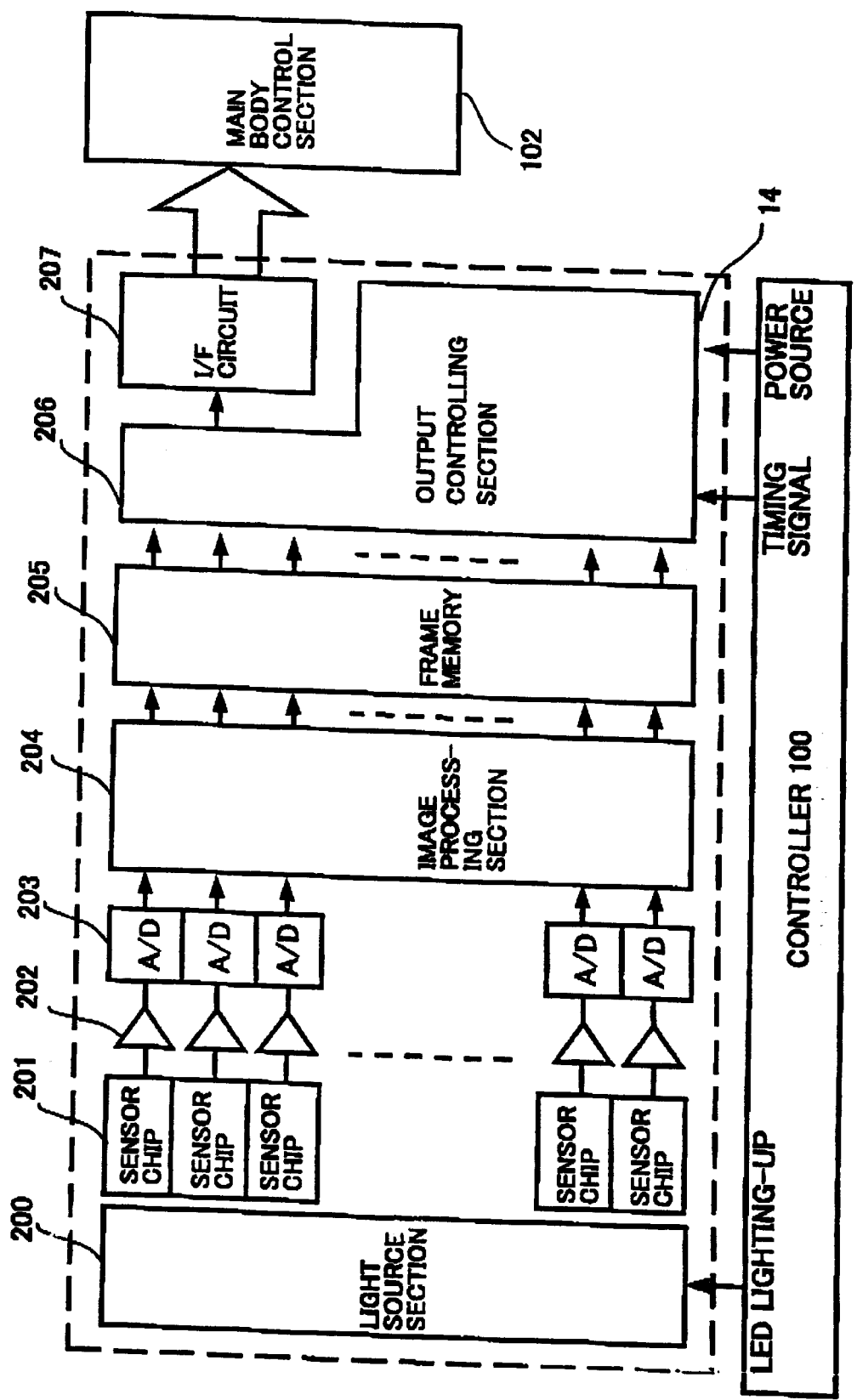

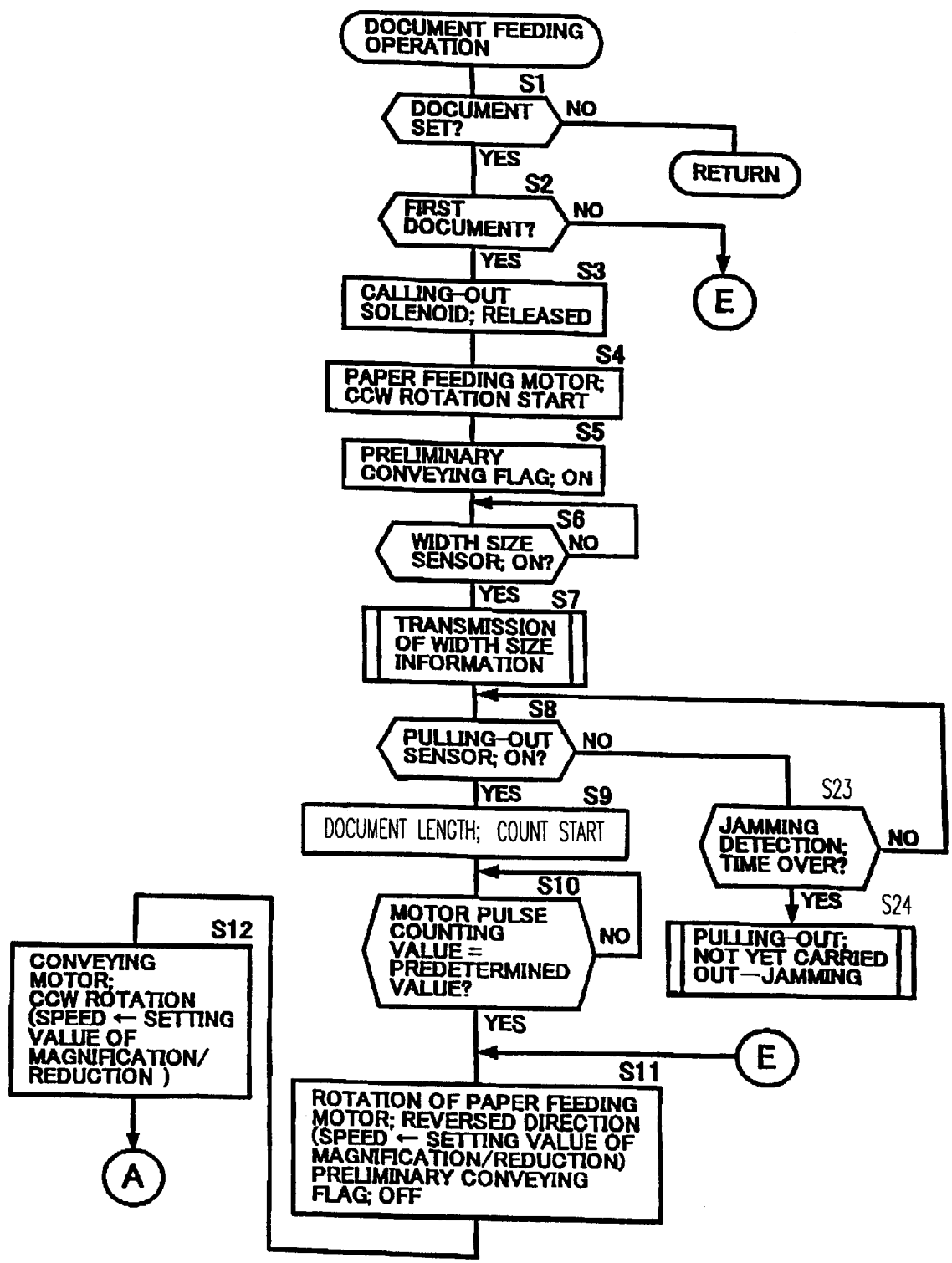

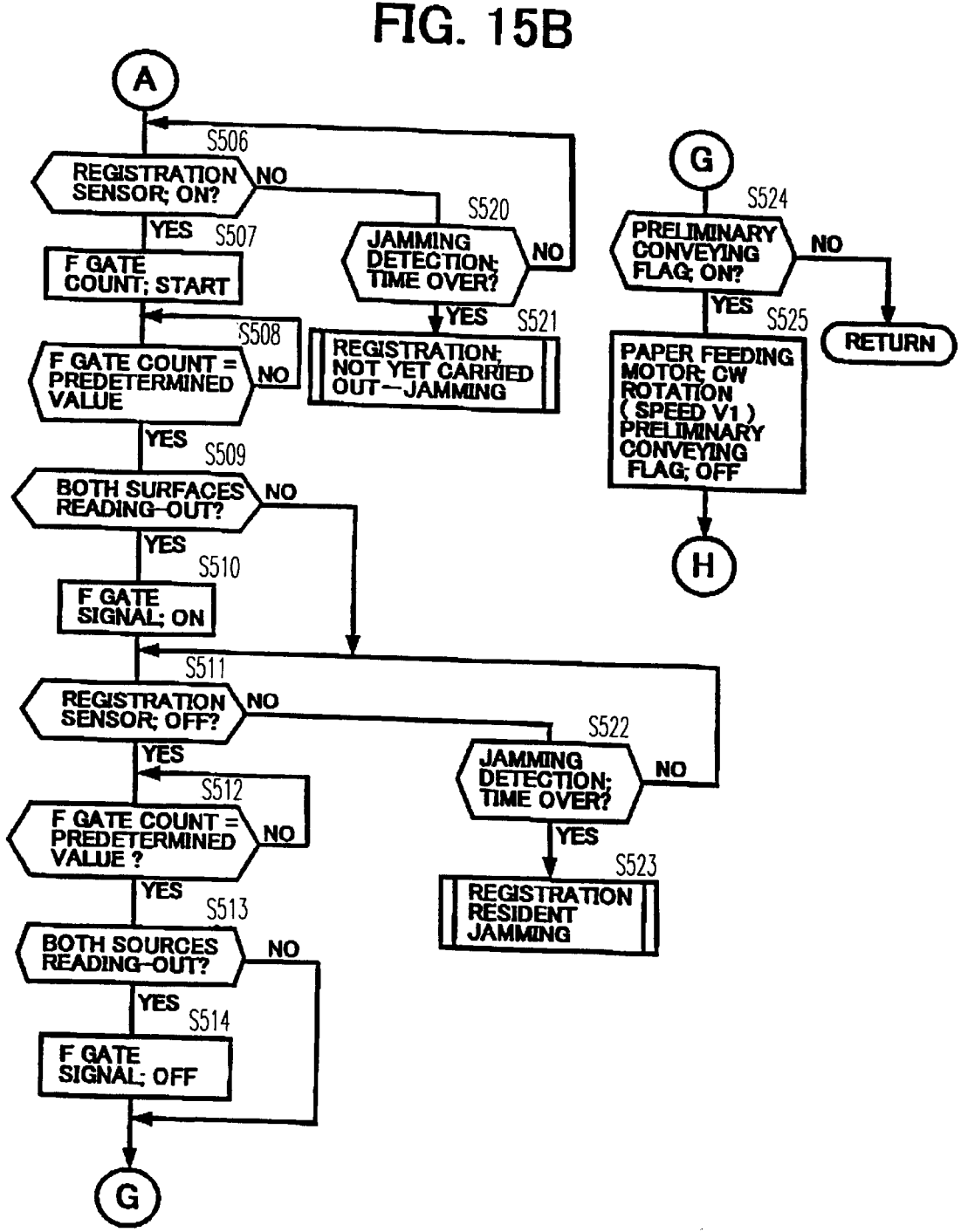

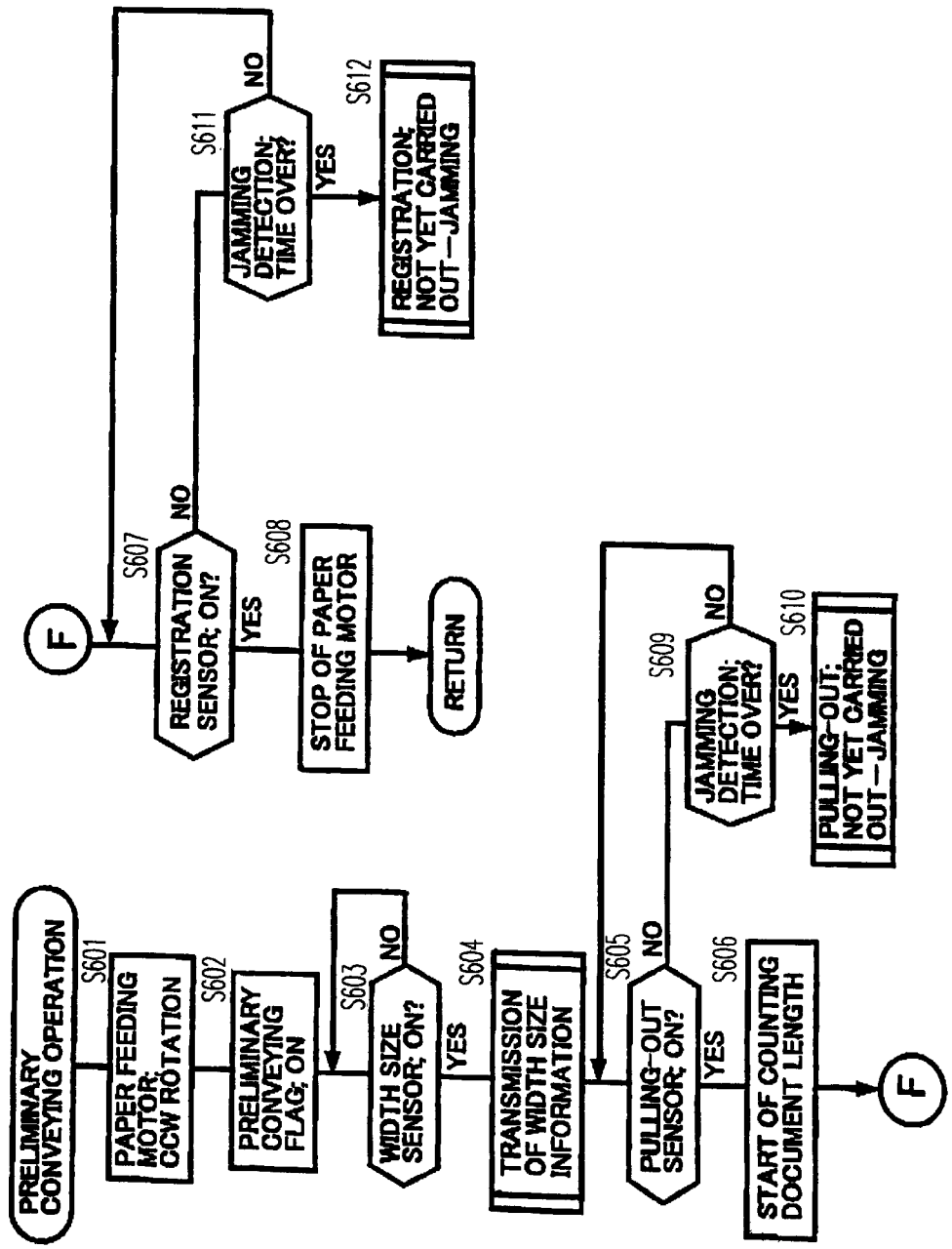

TWO-SIDED READING-OUT APPARATUS AND AN IMAGE FORMING APPARATUS

BACKGROUND OF THE INVENTION

1. Field of the Invention

The present invention relates to an original document reading-out apparatus in an image forming apparatus such as a copying machine, facsimile device, etc., and in particular, relates to a reading-out apparatus capable of reading out the front and rear surfaces of the original document and an image forming apparatus including therein the reading-out apparatus.

2. Discussion of the Background

In the past, as to the reading-out method of a two-sided reading-out apparatus in the image forming apparatus provided with an automatic document feeding apparatus (ADF), a scanning method of stopping the original document on the contact glass and scanning a portion of the original document and a sheet-through method of stopping the scanner and moving the original document are well known.

In the scanning method, since the original document is stopped in order on the contact glass, it needs a lot of time for the operator to exchange the original document. For this reason, in particular, it needs a lot of time to read out both surfaces of the original document, and therefore productivity is lowered. That is the defect to be solved. On the other hand, as to the sheet-through method, although the original document exchanging time can be shortened to the level not exerting any influence on the productivity, the process of turning over the original document is lengthy in order to arrange properly the page order after discharging the original document in the case of reading out the image of both surfaces of the original document, and therefore the productivity turns out to be lowered after all due to the processing time. That is a defect to be solved.

Furthermore, in the case of using the ordinary image forming apparatus, there exists either one of the scanning method and the sheet-through method as the reading-out method. In such situation, the original document feeding route of the automatic document feeder (ADF) carried in accordance with the reading-out method turns out to be determined.

Here, in the apparatus disclosed in the published specification of Japanese Laid-open Patent Publication No. 5-303246, the reading-out method of the image forming apparatus can be enabled to select, and the reading-out of the image on the original document can be made by changing over the original document feeding path of the ADF in accordance with the operational mode.

Furthermore, in the apparatus disclosed in the published specification of Japanese Laid-open Patent Publication No. 9-46483, because the original document is fed from one paper feeding opening (outlet), the scan reading-out and the sheet-through reading-out can be done.

Furthermore, in the copying system disclosed in the published specification of Japanese Laid-open Patent Publication No. 7-110641, the scan reading-out and the sheet-through reading-out can be done through one paper feeding opening (outlet) in consideration of the reading-out of the image on both sides of the original document.

Moreover, in the two-sided reading-out apparatus disclosed in the published specification of Japanese Published Patent No. 6-26416, the reading-out apparatus is provided with a movable reading-out unit which can be moved along the contact glass and a fixed reading-out unit disposed at the document advancing side or at the document discharging side of the document conveying belt for conveying the document put on the contact glass which is employed for reading out the opposite surface of the original document to the surface of the movable reading-out unit.

Furthermore, the published specification of Japanese Laid-open Patent Publication No. 1-194658 proposes an apparatus in which plural reading-out units are provided in order to improve the productivity in regard to the reading-out of both surfaces of the original document, and thereby the image on the first surface and that on the second surface are read out almost at the same time.

SUMMARY OF THE INVENTION

Heretofore, the background art regarding the two-sided reading-out apparatus and the image forming apparatus including the above apparatus have been described. However, according to such background art, for instance, disclosed in the background-art documents, e.g., Japanese Laid-open Patent Publication Nos. 5-303246, 9-46483, 7-110641, and 1-194658, and Japanese Published Patent No. 6-26416, there exists no advantageous functional effect for improving the two-sided reading-out apparatus and the image forming apparatus including therein the above apparatus.

The present invention has been made in view of the above-mentioned problems and other problems in order to solve the above-mentioned defects and troublesome matters of the background art. The present invention overcomes the various problems of the background art mentioned heretofore. The present invention provides the improved two-sided reading-out apparatus and the improved image forming apparatus including the above apparatus.

To state it more concretely, the object of the present invention is to solve the aforementioned problems. In the background-art technology disclosed in Japanese Laid-open Patent Publication No. 5-303246, since the direction of feeding the original document differs in accordance with the reading-out method, plural document discharging openings (outlets) have to be provided. As the result, the apparatus based on such technology is obliged to be made large-sized and requires a high cost for manufacturing it. That is a problem to be solved.

In the technology disclosed in Japanese Laid-open Patent Publication No. 9-46483, the reading-out of both surfaces of the original document which has been frequently used in recent years is not taken into consideration, and the improvement of the productivity cannot be intended regarding the reading-out of the image on both surfaces of the original document. That is another problem to be solved.

In the technology disclosed in Japanese Laid-open Patent Publication No. 7-110641, the timing of the turning-over of the original document in order to arrange properly the page order at the time of discharging the document and the additional processing time occurring due to the movement of the scanner turn out to be high. For this reason, there exists a limitation for improving the productivity. That is still another problem to be solved.

In the technology disclosed in Japanese Laid-open Patent Publication No. 1-194658, since the image data on the first surface of the original document and the image data on the second surface of the original document are overlapped on each other, plural image processing circuits have to be provided in order to process each of the respective image data. As a result, the cost of the entire apparatus is raised. That is still another problem to be solved.

In the technology disclosed in Japanese Published Patent No. 6-26416, the state of conveying the original document is constant even in either one of the operational mode of reading out only the surface of the original document and the other operational mode of reading out both surfaces of the original document. Even in the operational mode not required to read out the opposite surface of the original document by use of the fixed reading-out unit, the original document has to be moved so as to optimally read out the image by use of the fixed reading-out unit. Consequently, the productivity of the apparatus cannot be intended to be sufficiently improved. That is still another problem to be solved.

Furthermore, in the image forming apparatus having a size mixture AMS (paper designation magnification/reduction) mode in which original documents of different sizes are mixedly carried and conveyed, and read out with the magnification/reduction corresponding to the previously designated transfer paper size, since the width and the length of the original document are detected in the process of the paper conveyance after separating the original document, even though the transfer paper size is previously designated, the rate of the magnification/reduction at the sheet-through reading-out portion cannot be calculated until the document size is settled. That is still another problem to be solved.

In particular, in order to perform the size mixture AMS in the two-sided reading-out mode, for instance, it is necessary to secure a distance longer than the lengthwise-direction distance of the maximum original document size capable of reading out the distance between the original document separating portion and the sheet-through reading-out portion. As a result, the apparatus turns out to be large-sized and results in a cost run-up. In addition, the handling operation for the original document is complicated and thereby the number of the documents to be read out during the predetermined time period has to be reduced inevitably. That is still another problem to be solved.

As mentioned heretofore, in the background technologies, it is difficult to simplify the process practiced at the time of reading out the image on both sides of the original document and thereby secure the optimum productivity without resulting in any large-scaled apparatus and cost run-up therefor.

The primary object of the present invention is to provide the two-sided reading-out apparatus and the image forming apparatus including the reading-out apparatus capable of improving such subject matter mentioned heretofore, simplifying the process at the time of reading out the image respectively in the cases of reading out one side surface of the document and reading out both surfaces thereof, suppressing the need to make the apparatus large-sized and reducing the cost thereof, and thereby securing the optimum productivity of the apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 4 is a block diagram illustrating a structure of a fixed reading-out apparatus in the apparatus shown in FIG. 1;

FIG. 12 is a flow chart illustrating an operation of the two-sided reading-out apparatus of the third embodiment according to the present invention;

FIGS. 15A and 15B are flow charts illustrating an operation of exchanging the original document in the two-sided reading-out apparatus of the third embodiment according to the present invention;

FIG. 17 is a flow chart illustrating a preliminary conveying operation of the two-sided reading-out apparatus in the third embodiment according to the present invention.

DETAILED DESCRIPTION OF THE PREFERRED EMBODIMENTS

Figure 1:
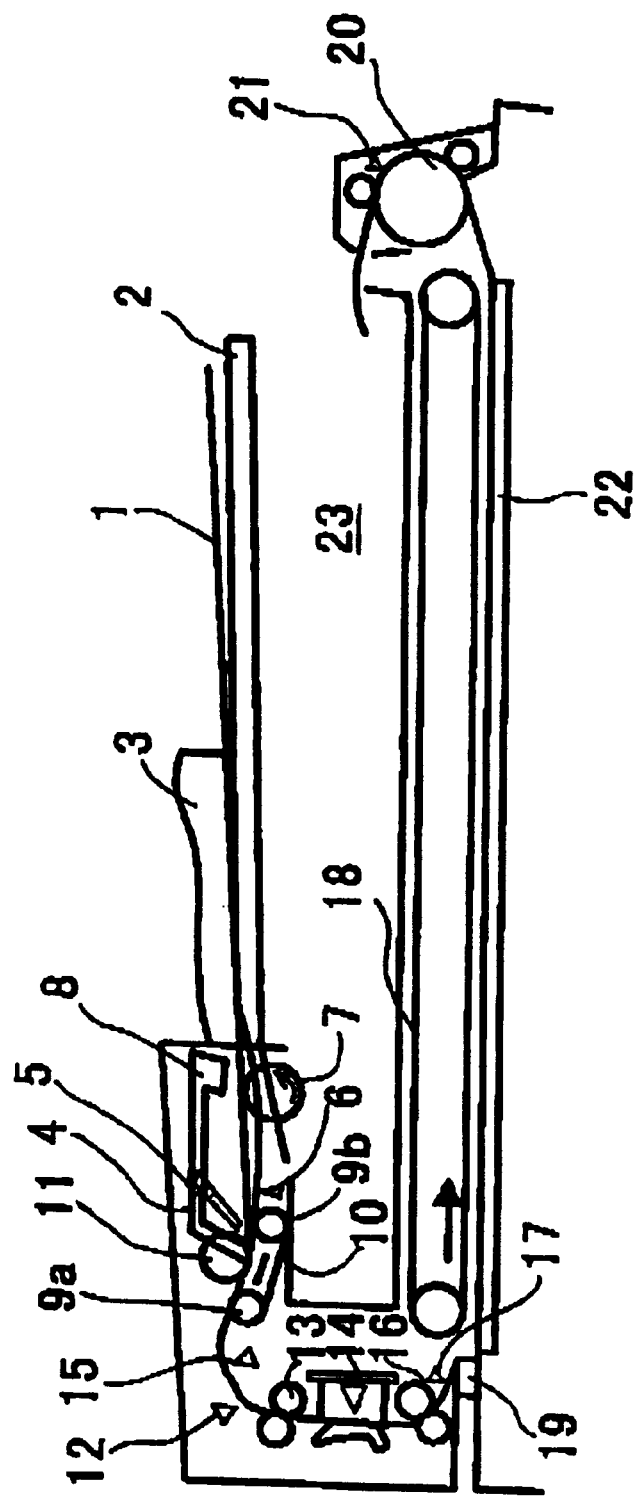
FIG. 1 is an outlined cross-sectional view illustrating an overall structure of a two-sided reading-out apparatus of the first embodiment according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIGS. 1, 5, 8, and 9 thereof, there are illustrated the improved two-sided reading-out apparatus and the improved image forming apparatus including the above two-sided reading-out apparatus.

To state it in more detail, as to the first aspect of the present invention, a two-sided reading-out apparatus comprises an original document piling medium piling thereon plural sheets of the original document so as to put upside a first surface of the original document, above a contact glass; a moving and reading-out medium moving and reading out the first surface of the original document conveyed onto a predetermined position on the contact glass from the original document piling medium and for stopping thereon the conveyed original document, below the contact glass; a fixed reading-out medium conveying separated original document and reading original document and reading out a second surface of the original document, below the original document piling medium and above the contact glass; a paper discharging medium discharging the original document conveyed through the fixed reading-out medium, below the original document piling medium and above the contact glass; a paper conveying medium conveying the original document along a first conveying path from the original piling medium to the contact glass and directing the conveyed original document from the contact glass to the paper discharging medium via the fixed reading-out medium and further conveying the original document along a second conveying path formed on the inner side of the first conveying path; a changing-over medium changing over the conveying direction of the original document to the side of the first conveying path or to the side of the second conveying path; and a paper conveyance controlling medium controlling the original document piling medium onto the contact glass along the first conveying path by use of the paper conveying medium and thereafter changing over the conveying direction to the side of the second conveying path and thereby inversely driving the paper conveying medium, and conveying the original document from the contact glass to the paper discharging medium via the fixed reading-out medium.

As to the second aspect of the present invention, the two-sided reading-out apparatus in relation to the first aspect further comprises a paper conveying belt brought into contact with the upper surface of the contact glass for conveying the original document piled on the contact glass; and a detection medium detecting the passage of the rear end of the original document on the paper conveying belt.

In the second aspect, the paper conveyance controlling medium controls the paper conveyance such that, after reading out the first surface of the preceding original document with the two-sided reading-out mode, when the paper conveying belt is rotated in a reverse direction and thereby the preceding original document is conveyed from the upper side of the contact glass to the second conveying path, the paper conveying direction is changed over to the side of the first conveying path by the changing-over medium with a timing when the detection medium detects the passage of the rear end of the preceding original document on the paper conveying belt, and the paper conveying belt is positively rotated and accelerated at the same time, and the next original document is conveyed onto the contact glass.

As to the third aspect of the present invention, a two-sided reading-out apparatus comprises an original document piling medium piling thereon plural sheets of the original document so as to put upside a first surface of the original document, above a contact glass; a fixed reading-out medium disposed on a position at the more downstream side in the original document conveying direction than that of the contact glass, above the contact glass and below the original document piling medium, for reading out a second surface of the original document at the time of conveying the separated original document; a movable reading-out medium reading out the first surface of the original document conveyed from the original document piling medium onto a predetermined position of the contact glass and stopped thereon at the time of moving the original document below the contact glass; a paper conveying medium conveying the original document along the paper conveying path expanding from the original document piling medium to the downstream of the fixed reading-out medium through the contact glass; and a paper conveyance controlling medium changing the preliminary conveying position for previously conveying the next original document and waiting temporarily with a one-side surface mode of reading out only one side surface of the original document and with a two-side surfaces mode of reading out both surfaces of the original document, before ending the reading-out of the original document.

As to the fourth aspect of the present invention, in the two-sided reading-out apparatus in relation to the first through third aspects, the reading-out apparatus has a mixed-designation magnification/reduction mode of piling the original document of different size on the original document piling medium; and utilizing the optical magnification/reduction, the original document is read out with the reading-out magnification/reduction which has been previously designated.

As to the fifth aspect of the present invention, in the two-sided reading-out apparatus in relation to the first through fourth aspects, the paper conveyance controlling medium perform is the control operation, such that the paper conveying speed with the one-side surface reading-out mode by use of the fixed reading-out medium becomes higher than the paper conveying speed by use of the fixed reading-out medium in the case of reading out the second surface of the original document with the two-side surfaces reading-out mode.

As to the sixth aspect of the present invention, in the two-sided reading-out apparatus in relation to the first through fifth aspects, in a page number setting medium inputting and setting the page numbers of the original document piled on the original document piling medium, the paper conveyance controlling medium accelerates the paper conveyance such that, when a final original document ends on an odd-numbered page of the original document with the two-sided reading-out mode, the second surface of the final original document is not read out, and the paper conveying speed in the case of reading out the first surface of the original document by use of the fixed reading-out medium becomes higher than the paper conveying speed in the case of reading out the second surface of the original document by use of the fixed reading-out medium.

As to the seventh aspect of the present invention, the two-sided reading-out apparatus comprises an original document piling medium piling thereon plural sheets of the original document so as to put upside a first surface of the original document, above a contact glass; a fixed reading-out medium disposed on a position at the more downstream side in the original document conveying direction than that of the contact glass, above the contact glass and below the original document piling medium, for reading out a second surface of the original document at the time of conveying the separated original document; a movable reading-out medium reading out the first surface of the original document conveyed from the original document piling medium onto a predetermined position of the contact glass and stopped thereon at the time of moving the original document below the contact glass; a paper conveying medium conveying the original document along the paper conveying path expanding from the original document piling medium onto the contact glass through fixed reading-out media; and a paper conveyance controlling medium changing the preliminary conveying position for previously conveying the next original document and waiting temporarily with a one-side surface mode of reading out only one-side surface of the original document and with a two-side surfaces mode of reading out both surfaces of the original document, before ending the reading-out of the original document.

As to the eighth aspect of the present invention, in the two-sided reading-out apparatus in relation to the seventh aspect, the paper conveying path is structured such that the cross section thereof is almost formed in the shape of a Japanese letter "ヲ" (one-side opened rectangle), and the paper conveying direction at the time of separating the original document from the original document piling medium and feeding it to the subsequent stage becomes almost reverse to the paper conveying direction on the contact glass.

As to the ninth aspect of the present invention, in the two-sided reading-out apparatus in relation to the seventh or eighth aspect, the paper conveyance controlling medium performs the control operation such that, after the original document passes through the fixed reading-out medium with the two-sided reading-out mode, the paper conveying speed is further accelerated and the original document is conveyed onto the contact glass with the speed thus accelerated.

As to the tenth aspect of the present invention, in the two-sided reading-out apparatus in relation to the seventh through ninth aspects, when the original document is thinner than predetermined paper and the image is formed only on the first surface of the original document, the direction of the first surface of the original document to be piled on the original document piling medium is designated, wherein the reading-out apparatus has a thinner paper mode of reading-out the first surface of the original document by use of the movable reading-out medium.

As to the eleventh aspect of the present invention, in the two-sided reading-out apparatus in relation to the seventh through ninth aspects, the invention further comprises a page number setting medium for inputting and setting the page numbers of the original document piled on the original document piling medium, and the paper conveyance controlling medium accelerates the paper conveyance such that, when the final original document ends on the odd-numbered page of the original document with the two-sided reading-out mode, the second surface of the final original document is not read out, and the paper conveying speed in the case of reading out the first surface of the original document by use of the movable reading-out medium becomes higher than the paper conveying speed in the case of reading out the second surface of the original document by use of the movable reading-out means.

As to the twelfth aspect of the present invention, in an image forming apparatus comprising the two-sided reading-out apparatus in relation to either one of the preceding aspects (first through eleventh aspects), the image forming apparatus has mixed designation magnification/reduction mode in which the original document of a different size is piled on the original document piling medium, and utilizing the optical magnification/reduction, the original document is read out with the reading-out magnification/reduction corresponding to the previously designated size of transferring paper.

The preferred embodiments of the present invention are concretely described in detail, hereinafter, referring to the accompanying drawings. However, the present invention is not always limited to the described contents. It includes wider scope than that of the description.

First Embodiment

Figure 2:
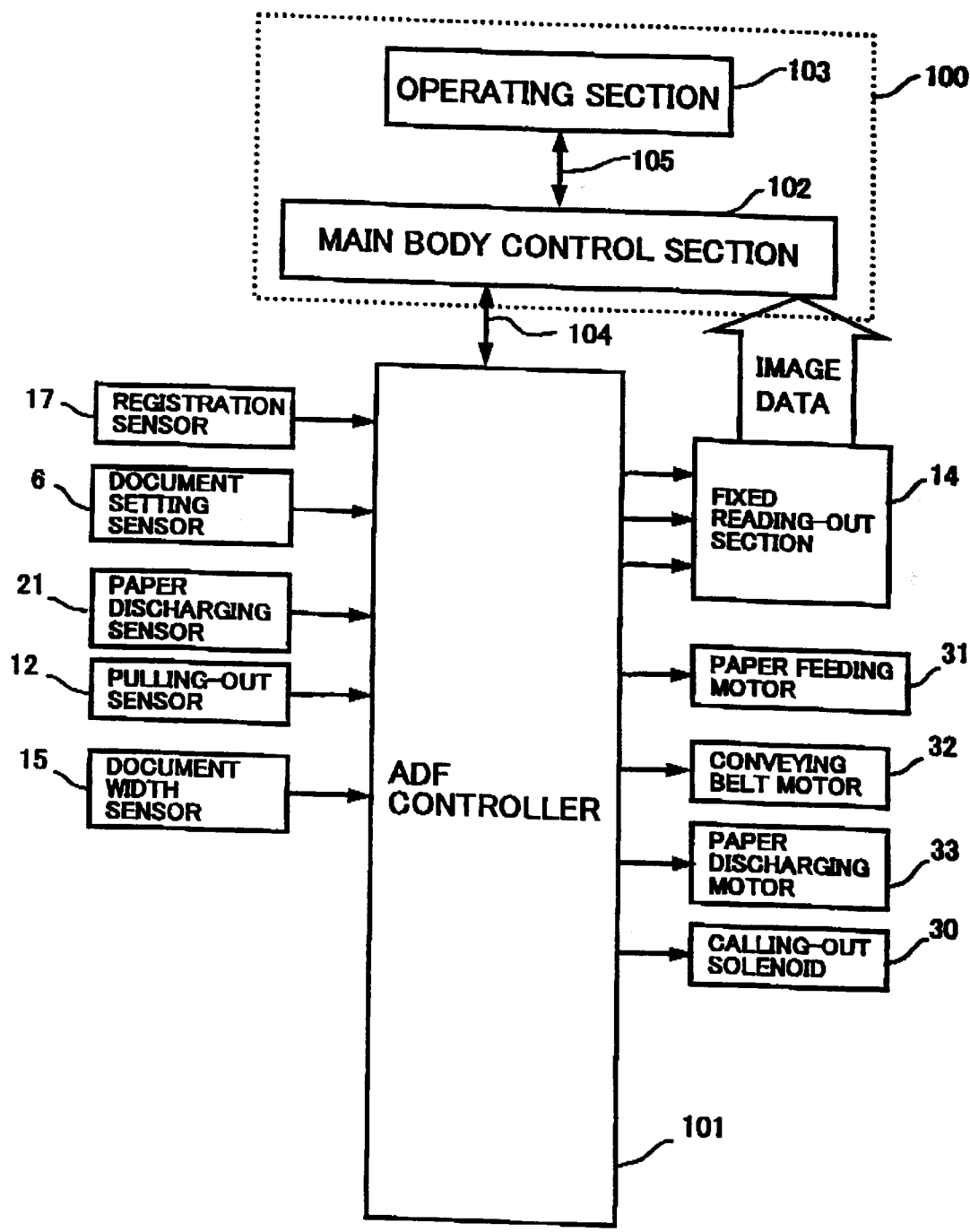
FIG. 2 is a block diagram illustrating an outlined structure of a control system in the apparatus shown in FIG. 1.
Figure 3:
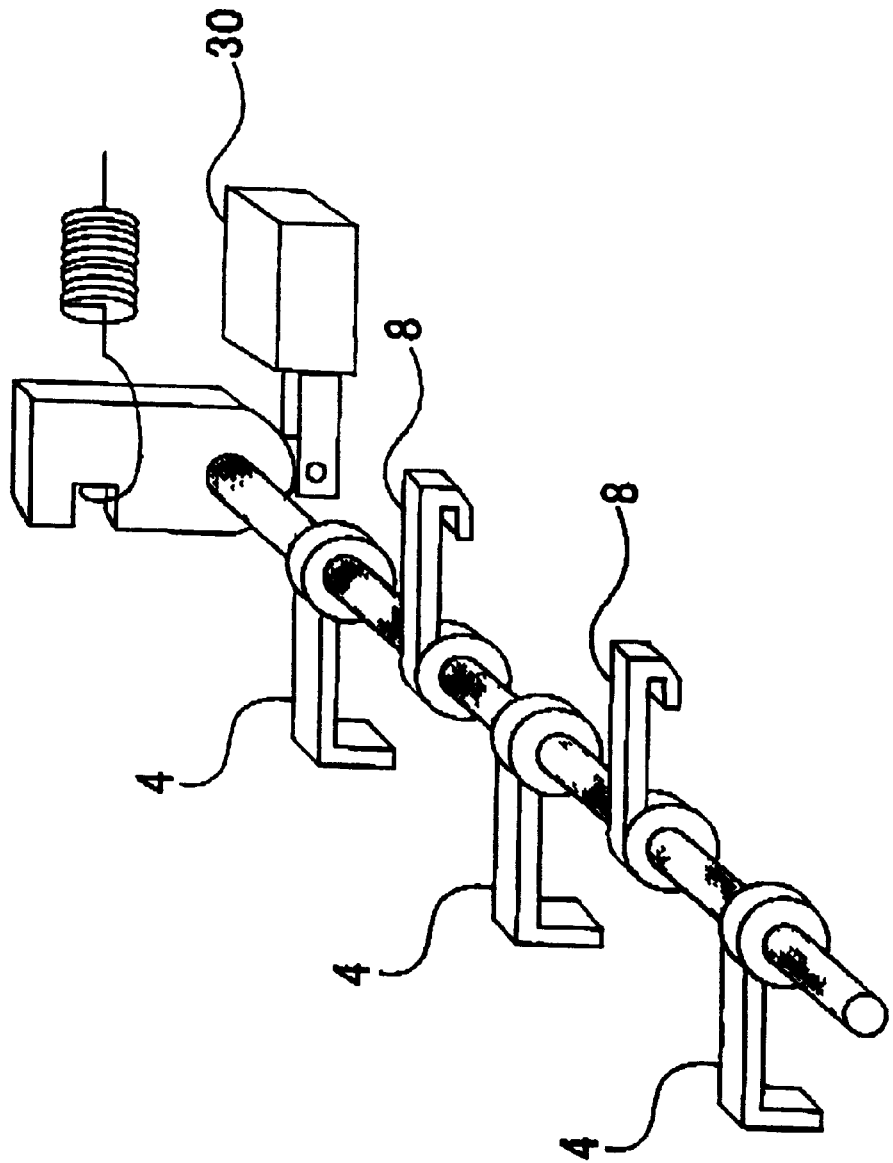
FIG. 3 is a perspective view illustrating a drive mechanism of an original document stopper and a pressurizing lever both provided on an original document stand of the apparatus shown in FIG. 1.

FIG. 1 is an outlined cross-sectional view illustrating an overall structure of the two-sided reading-out apparatus in the first embodiment according to the present invention. FIG. 2 is a block diagram illustrating an outlined structure of the control system of the same apparatus. FIG. 3 is a perspective view illustrating a drive mechanism for the original stopper and the pressurizing lever both provided on the document stand of the apparatus shown in FIG. 1. FIG. 4 is a block diagram illustrating the structure of the fixed reading-out apparatus of the apparatus shown in FIG. 1. The structure of the first embodiment is described referring to FIGS. 1 through 4.

In FIG. 1, there is shown a document bundle 1 composed of plural sheets of the original document, an original documents stand 2 for piling thereon the bundle 1 of those documents, a side guide 3 for guiding the side surface of the original document bundle 1 piled on the documents stand 2 and thereby correctly putting the document so as not to cause any skew in the document width direction, a document stopper 4 for aligning the tip end of the document bundle 1, a setting sensor feeler 5 and a document setting sensor 6 both for detecting the setting state of the document bundle 1 onto the document stand 2, a calling-out roller 7, a pressurizing lever 8, and a driving roller 9a and a driven roller 9b for a paper feeding belt 10. A paper feeding section is composed of those elements 1 through 9b.

Furthermore, the paper feeding belt 10, a reverse roller 11, a pulling-out sensor 12, a pulling-out roller 13, and a document width sensor 15, etc. are provided, in order to feed a document sheet from the document bundle 1 piled on the document stand 2. A fixed reading-out section 14 is provided on the halfway position where the paper feeding direction is charged such that the feeding path of the original document to be fed by those elements 1 through 9b is directed downwardly. The original document is fed between a conveying belt 18 and a contact glass 22 via a reading-out roller 16 and a registration sensor 17. Furthermore, in FIG. 1, there is shown a scale 19, a paper discharging roller 20, and a paper discharging sensor 21. The sensor 21 is the one for decreasing the conveyance speed at the time of discharging the original document and improving the stacking property of the discharged document on a paper discharging tray 23, and at the same time detecting the paper jamming at the time of conveying the document.

As shown in FIG. 2, a control system in the apparatus shown in FIG. 1 has a main body control section 102 in a control section 100 installed in the not-shown image forming apparatus main body and an ADF controller 101 connected to an operating section 103. The document setting sensor 6, the pulling-out sensor 12, the fixed reading-out section 14, the document width sensor 15, the registration sensor 17, and the paper discharging sensor 21 are respectively connected to the ADF controller 101. Furthermore, a calling-out solenoid 30 for driving the document stopper 4, a paper feeding motor 31 for driving the calling-out roller 7 and the paper-feeding belt driving roller 9a and thereby rotating the paper feeding belt 10, a conveying belt motor 32 for rotatively driving the conveying belt 18, and a paper discharging motor 33 for rotatively driving the paper discharging roller 20 are connected thereto. Interface circuit (I/F circuit) 104 connects the ADF controller 101 to the main body control section 102 and interface circuit (I/F circuit) 105 in turn connects the main body control section 102 to the operating section 103.

Furthermore, the operating section 103 is provided with keys such as a start/stop key, a ten-key, a function key, a YES/NO key, a cursor key, a various-sorts modes key, etc., and a displaying unit composed of an LCD, an LED, etc. The user can set ordinary paper/thin paper mode (one-side surface paper thinner than the predetermined thickness mode; thin paper mode and ordinary paper not thinner than the predetermined thickness mode; ordinary paper mode), one-side surface/both surfaces reading-out mode, AMS (paper designating magnification/reduction) mode, mixed paper carrying mode, by operating the keys on the operating section 103. The direction of setting the original document (setting the document surface; upward or downward) is selected and set. In particular, in the thin paper mode, the upward setting of the document surface is designated and displayed by the control operation of the main body control section 102, while the document surface is set downward in the ordinary paper mode. Furthermore, regarding a preliminary conveying position (previous conveying position) mentioned later, the position has been already set by the key operation, etc. of the operating section previously performed by the service technician, or the position has been already stored as the control data in the memory, etc. of the ADF controller 101.

As shown in FIG. 3, the document stopper 4 and the pressurizing lever 8 are respectively mounted on a shaft rotatively driven by the calling-out solenoid 30 of a type called a "keep solenoid", etc. The document stopper 4 elevated so as to back away from the document surface, and at the same time the pressurizing lever 8 descends and is brought into contact with the upper surface of the document bundle 1 (not shown). When the shaft is reversely rotated by the calling-out solenoid 30, the operations of the document stopper 4 and the pressurizing lever 8 are made inverse to the aforementioned operation.

Furthermore, as shown in FIG. 4, the fixed reading-out section 14 is provided with a light source section 200, a sensor chip 201, an amplifier 202, an A/D (analog-to-digital) converting section 203, an image processing section 204, a frame memory 205, an output controlling section 206, and an I/F circuit 207. In the light source section 200, there may be an LED array, a fluorescent lamp, a cool cathode ray tube, etc. Furthermore, in the sensor chip 201, an employed elements group composed of plural optoelectric conversion elements called equal-size closely adhered sensors and plural light focusing lens members are arranged in accordance with the width-direction length of the original document to be read out. Although a closely adhered sensor is employed in FIG. 4, if some space can be taken in the ADF interior, it may be possible to adapt one in which a reduced-size optical system may be used. The information of the brightness/darkness of the original document illuminated by the light radiated from the light source section 200 is converted to an electric signal by the sensor chip 201. The converted electric signal is amplified by the amplifier 202 and converted to the digital signal by the A/D converting section 203. The shading compensation is done for the image in the image processing section 204. The image data reading out the original document is accumulated in the frame memory 205. The image data thus accumulated is converted to the data acceptable to the main body control section 102 in the output control circuit 206 and further transferred to the main body control section 102 through the I/F circuit 207. The control section 100 supplies a timing signal and a power source voltage. As to the timing signal, it notifies the timing when the tip end of the document arrives at the fixed reading-out section 14 (FIG. 1), and the image data at the time subsequent to the timing are employed as the effective data Next, the operation of the first embodiment according to the present invention is explained hereinafter referring to the flow charts shown in FIGS. 5A through 7B. Regarding the direction of the image surface at the time putting the original document on the document stand 2, the first surface (front surface) is faced in the upward direction. The document is usually called out by the calling-out roller 7 from the lower surface of the document bundle 1. Consequently, the scanner (not shown) in the image forming apparatus main body usually reads out the first surface, and the fixed reading-out section 14 reads out the second surface (rear surface). The following explanation takes the case of the downward setting in accordance with the thin paper mode.

A single sheet of the document or the document bundle 1 is set to the upward direction (or to the downward direction), and is set onto the document stand 2 such that the tip end portion thereof collides with the document stopper 4. The setting sensor feeler 5 is lifted up by the document bundle 1 and thereby the light intercepting state of the document setting sensor 6 is released. As a result, the ADF controller 101 transmits the document setting signal to the control section 100 of the image forming apparatus main body through the I/F circuit 104. Refer to Step S1 in FIG. 5A. The user pushes down the print key (not shown) provided in the operating section 103 in the control section 100 of the image forming apparatus main body. Namely, the original document to be processed is the first one (in Step S2 in FIG. 5A), the main body control section 102 transmits the one-side surface/both surfaces reading-out mode signal, the reading-out magnification/reduction signal, and the original document feeding signal to the ADF controller 101 through the I/F circuit 104. At this time, the paper-feeding operation is started and the document stopper 4 is backed away from the document setting surface by driving the calling-out solenoid 30. At the same time, the pressurizing lever 8 descends and is brought into contact with the upper surface of the document bundle 1. In this way, the document setting is completed (Step S3 in FIG. 5A).

Figure 5A:
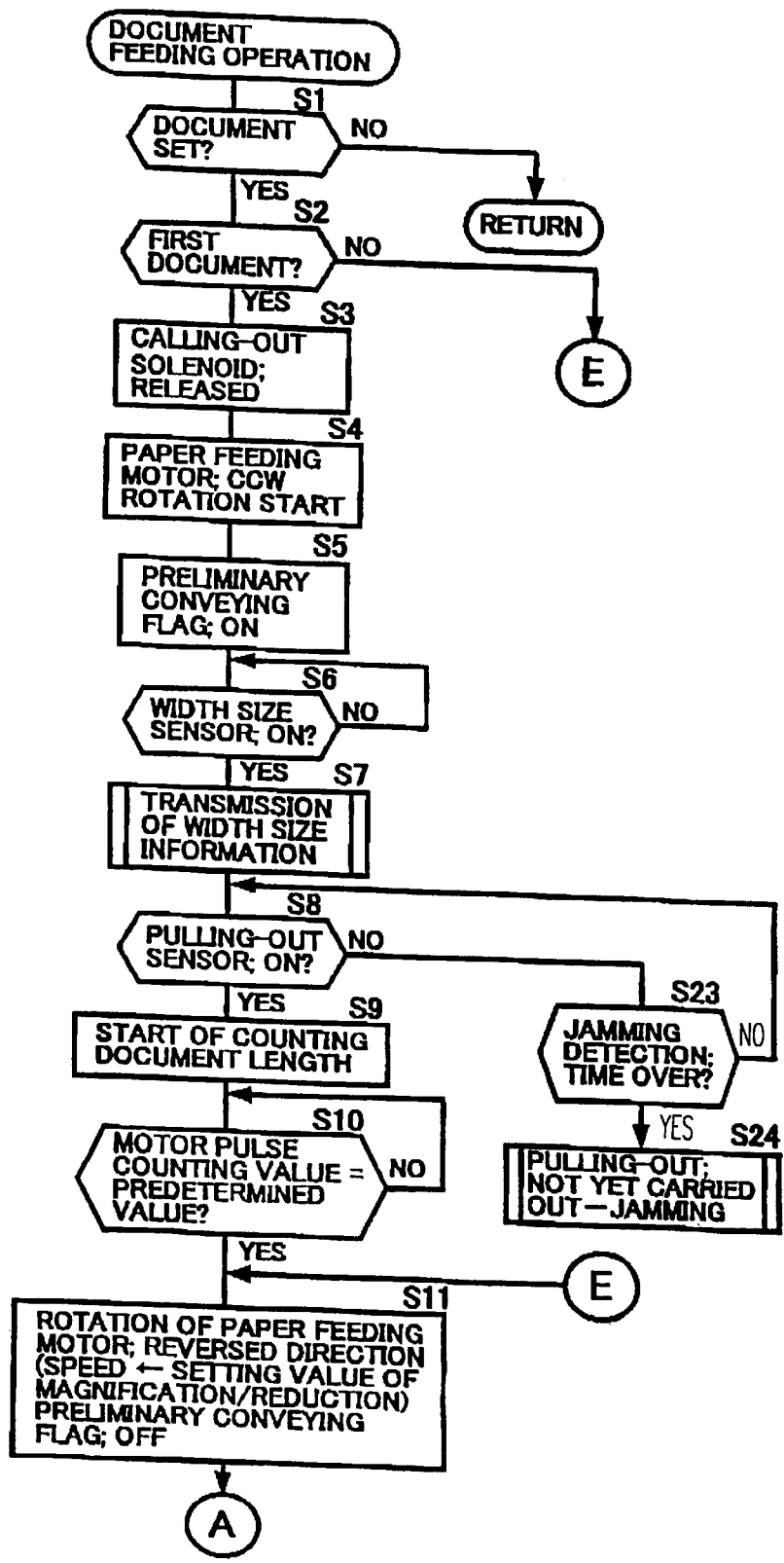
FIGS. 5A and 5B are flow charts illustrating the operation of the two-sided reading-out apparatus shown in FIGS. 1 through 4 in the first embodiment according to the present invention.

The calling-out roller 7 and the paper feeding belt driving roller 9a are rotatively driven in the counterclockwise direction, as shown in FIG. 1, by the paper feeding motor 31 (FIG. 2), and thereby the paper feeding belt 10 (FIG. 1) is also rotatively driven (Step S4 in FIG. 5A). The rotative direction of those elements is shown by the arrow mark in FIG. 1. Thereby, the lowermost original document is separated from the documents bundle 1 and the document thus separated is fed to the subsequent stage. At this time, a preliminary conveying flag (not shown) is turned ON (Step S5 in FIG. 5A). The reverse roller 11 (FIG. 1) is connected thereto through a torque limiter (not shown). When one sheet of the document exists between the paper feeding belt 10 and the reverse roller 11, the document is co-rotated in the document feeding direction. On the other hand, when two or more sheets of the document enter the nip portion of the paper feeding belt 10, since the limit torque of the torque limiter is larger than the coefficient of friction between the documents, the reverse roller 11 rotates in the direction opposite to that of the document feeding direction so as to bring back the upper document to the side of the document stand 2 and only the lowermost document is sent to the pulling-out roller 13.

When the width-direction size of the document separated by the document width sensor 15 disposed in the neighborhood of the pulling-out sensor 12 is detected (Step S6 in FIG. 5A), the document width size signal is transmitted to the main body control section 102 (FIG. 2), and the setting of the document reading-out width and the setting of the document size at the time of a facsimile transmission are made (Step S7 in FIG. 5A).

The original document is conveyed until the tip end of the document is detected by the pulling-out sensor 12 (FIG. 1).

When the pulling-out sensor 12 detects the tip end of the document (Step S8 in FIG. 5A), the document length counting is started at the same time (Step S9 in FIG. 5A). After the predetermined pulses are counted or the predetermined time elapses (Step S10 in FIG. 5A; according to the flow in FIG. 5A, Motor Pulse Counting Value= Predetermined Value), the direction of driving the paper feeding motor 31 (FIG. 2) is reversed (Step S11 in FIG. 5A), and the pulling-out roller 13 (FIG. 1) and the reading-out roller 16 are rotatively driven. Then, the rotative driving of the paper feeding belt 10 and that of the reverse roller 11 are stopped. The document is fed, by the pulling-out roller 13, to the fixed reading-out section 14 with the same speed as that of the scanning speed of the scanner (not shown). At this time, the reading-out of the document is started at the fixed reading-out section 14. Furthermore, in Step S2 in FIG. 5A, when the document is not the first one in Step S2, skipping to the Step S11, the process advances to Step S12 and then to the subsequent steps in FIG. 5B.

Figure 5B:
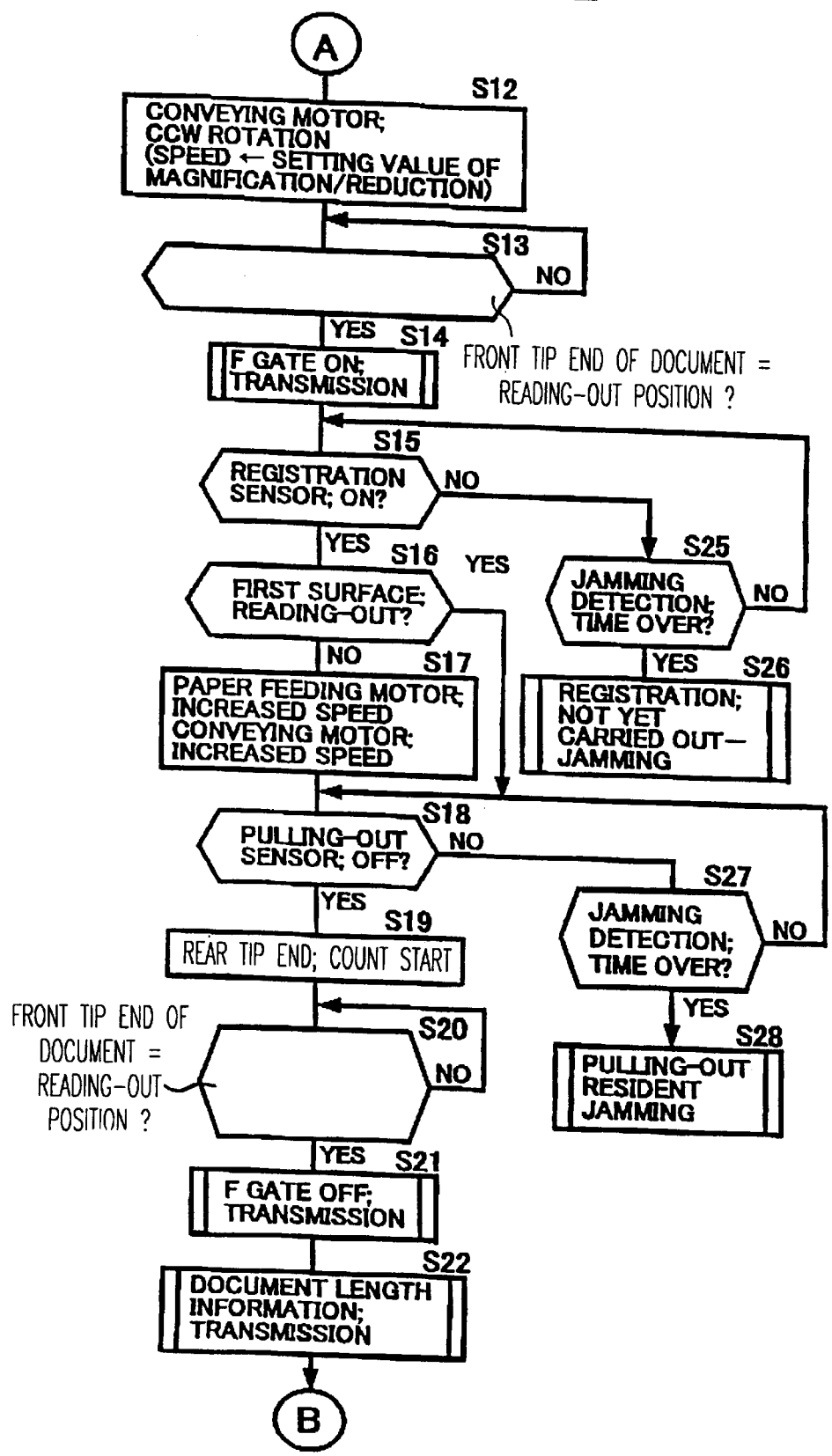

Next, when the tip end of the document arrives at the reading-out position (Step S13 in FIG. 5B), an F-gate-ON signal showing the start of the reading-out operation is transmitted (Step S14 in FIG. 5B). In the case of the both-surfaces reading-out mode, since the tip end of the original document is detected by the registration sensor 17 (FIG. 1) during the time period of reading out the image on the first surface with the fixed reading-out section 14, the speed of the paper feeding motor 31 (FIG. 2) and that of the conveying belt motor 32 are set both to the reading-out magnification/reduction for the first surface. The document is conveyed onto the contact glass 22 (FIG. 1) with the speed corresponding to the magnification/reduction.

On the other hand, in the case of the one-side surface reading-out mode, the document downward setting is selected and both surfaces of the document are read out, corresponding to the document setting surface which can be selected by the input from the operating section 103 in FIG. 2 (ordinarily, the direction of the document setting surface is upward, while the downward setting thereof can be made by the setting, etc. from the operating section 103). At this time, the image on the surface of the document is read out by the fixed reading-out section 14.

In the one-side surface reading-out mode in the case of selecting the document upward setting, since the image is read out only by the scanning operation of the scanner in the image forming apparatus main body without using the fixed reading-out section 14, the paper feeding motor 31 and the conveying belt motor 32 are both accelerated by the document tip end detection by use of the registration sensor 17 (Steps S16 and S17 in FIG. 5B).

Moreover, when the registration sensor 17 cannot detect the document tip end after the elapsing predetermined time in Step S15 in FIG. 5B (Step S25 in FIG. 5B), the registration not-yet arriving jamming is judged and a signal is transmitted to the main body control section 102 (Step S26 in FIG. 5B).

By the document rear end detection by use of the pulling-out sensor 12 (Step S18 in FIG. 5B), the pulse counting of the paper feeding motor 31 is started (Step S19 in FIG. 5B). When the leading tip end of the document arrives at the reading-out position on the contact glass 22 of FIG. 1, the rear end of the document judges the passage on the fixed reading-out section 14 (Step S20 in FIG. 5B). At this time, an F-gate-OFF signal showing the completion of reading out is transmitted to the apparatus main body (Step S21 in FIG. 5B). Then, the rotation of the conveying belt motor 32 is accelerated and the document length information is transmitted (Step S22 in FIG. 5B) and the document is conveyed to the paper discharging roller 20 in FIG. 1 with high speed (Step S22 in FIG. 5B) and discharged therefrom.

Furthermore, in the aforementioned Step S18, when the pulling-out sensor 12 cannot detect the rear end of the document after the elapsed predetermined time (Step S27 in FIG. 5B), the apparatus judges the reason to be pulling-out resident jamming and a signal judgment result) is transmitted to the main body control section 102 (Step S28 in FIG. 5B).

Figure 6:
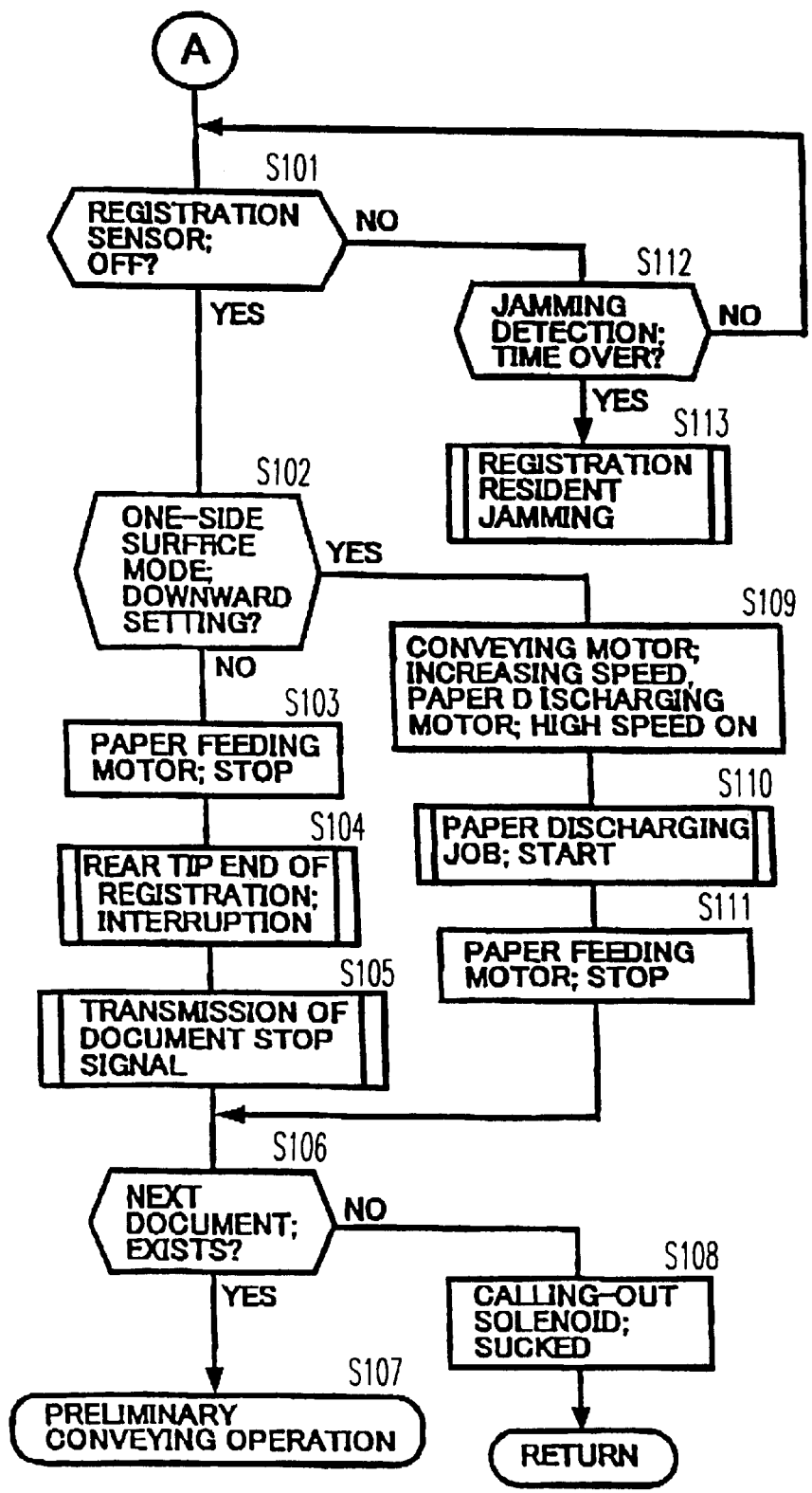
FIG. 6 is a flow chart illustrating an operation subsequent to the operation explained in FIG. 5.

When the registration sensor 17 detects the rear end of the document and is turned OFF (Step S101 in FIG. 6), after confirming the one-side surface reading-out made-not upward setting of the document (Step S102 in FIG. 6), the paper feeding motor 31 is stopped (Step S103 in FIG. 6). At the same time, the registration rear end interrupting process is performed (Step S104 in FIG. 6). During that time period, the driving speed of the conveying belt motor 32 is decreased. Then, the control operation is done such that the document is conveyed by a predetermined number of pulses and thereafter the rear end of the document steps on the scale position of the contact glass 22 (the thin paper mode).

In the thin paper mode, the direction of the document is previously set so as to be made downward under the instruction of the main body control section 102 and the first surface is read out by the fixed reading-out section 14 (FIG. 2).

Moreover, in the case of the document having a thickness equal to or thicker than the predetermined paper thickness, the document is conveyed so as to cause the scale 19 of FIG. 1 to overrun, and thereafter the conveying belt 18 is driven in the reverse direction and the skewing compensation is performed by causing the end portion of the document to collide with the scale 19 (the ordinary mode). When the document stops on the position of the scale 19, the document stopping signal is transmitted to the main body control section 102 (FIG. 2) of the image forming apparatus main body (Step S105 in FIG. 6). The image on the second surface of the document (the upper surface of the document in the state of putting the document on the document stand 2 in FIG. 1) is read out by the scanner in the image forming apparatus main body (not shown). Thereafter, the reading-out operation is done in order for the lowermost document of the document bundle 1. During that time period, the next document on the document stand 2 is preliminarily conveyed to the pulling-out roller 13 (Step S107 in FIG. 6). When the next document does not exist, the calling-out solenoid 30 of FIG. 2 is actuated to the sucking side and thereby the document stopper 4 in FIG. 1 is caused to descend and at the same time the pressurizing lever 8 is caused to rise up. Thus, the document bundle 1 can be put in the setting state (Step S108 in FIG. 6).

In Step S102 of FIG. 6 as mentioned before, in the case of setting upward the direction of the document (image surface) in the one-side surface reading out mode, the rotative speed of the conveying belt motor 32 of FIG. 2 is accelerated (Step S109 in FIG. 6), and the document is conveyed to the paper discharging roller 20 in FIG. 1 with high speed and discharged therefrom (Step S110 in FIG. 6). At this time, the paper feeding motor 31 of FIG. 2 is stopped (Step S111 in FIG. 6). Furthermore, in the aforementioned Step S101 of FIG. 6, when the registration sensor 17 cannot detect the rear end of the document even after a predetermined time elapses (Step S112 in FIG. 6), the sensor 17 judges that the reason is the registration resident (staying)

jammed and transmits a signal to the main body control section 102 (Step S113 in FIG. 6).

Figure 7A:
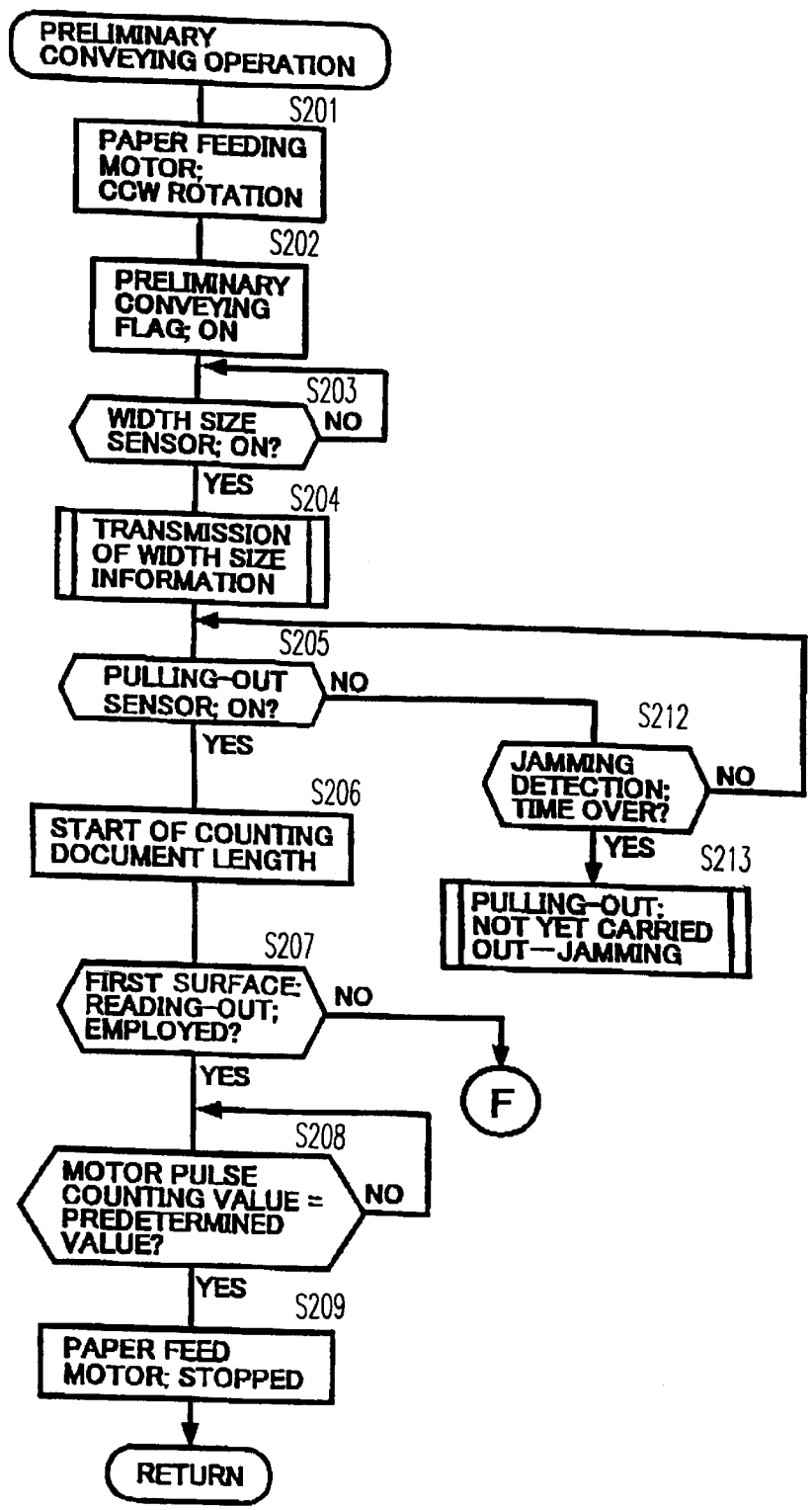
FIGS. 7A and 7B are flow charts illustrating a preliminary conveying operation subsequent to the operation explained in FIG. 6.
Figure 7B:
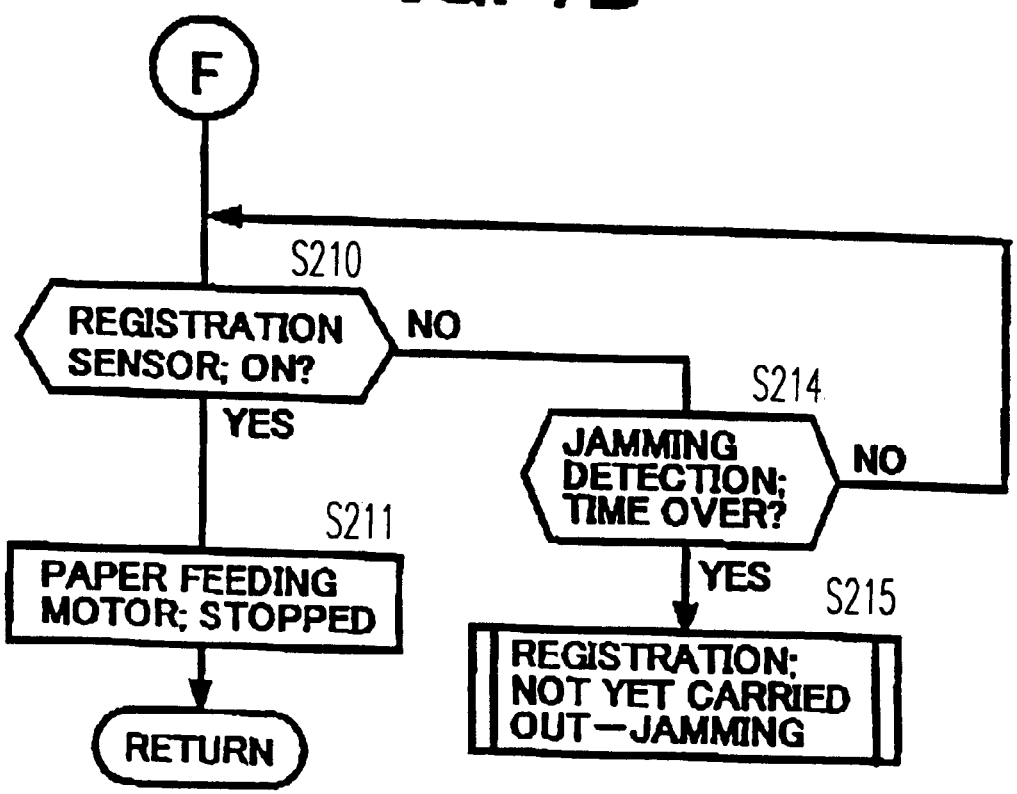

FIGS. 7A and 7B are flow charts illustrating in detail the preliminary conveying operation shown in Step 7 of FIG. 6.

In the preliminary conveying operation, the calling-out roller 7 and the paper feeding belt driving roller 9a of FIG. 1 are rotatively driven in the counterclockwise (CCW) direction by the paper feeding motor 31 of FIG. 2. Thus, the paper feeding belt 10 of FIG. 1 is also rotatively driven (Step S201 in FIG. 7A). The lowermost document of the document bundle 1 is separated therefrom and fed to the subsequent stage, and at this time the preliminary conveying flag is turned ON (Step S202 in FIG. 7A). When the size of the separated document in the width direction is detected by the document width sensor 15 (Step S203 in FIG. 7A), the document size signal is transmitted to the main body control section 102 of FIG. 2 (Step S204 in FIG. 7A).

The document is conveyed until the tip end of the document is detected by the pulling-out sensor 12. When the pulling-out sensor 12 detects the tip end of the document (Step S205 in FIG. 7A), at the same time the document length counting is started (Step S206 in FIG. 7A). When the image reading-out operation is done by the fixed reading-out section 14 (Step S207 in FIG. 7A), the paper feeding motor 31 is stopped and the preliminary conveying operation is terminated (Step S209 in FIG. 7A), from this time point after conveying the predetermined number of pulses (Step S208 in FIG. 7A). In the case of not performing the image reading-out operation by use of the fixed reading-out section 14, the document is conveyed until the tip end of the document is detected by the registration sensor 17 (Step S210 in FIG. 7B). Thereafter, the preliminary paper feeding operation is terminated (Step S211 in FIG. 7B).

Moreover, in the aforementioned Step S205 of FIG. 7A, when the pulling-out sensor 12 does not detect the tip end of the document even after the predetermined time elapses (Step S212 in FIG. 7A), the sensor 12 judges that the reason is the pulling-out nonarrival jamming and transmits a signal to the main body control section 102 (Step S213 in FIG. 7A). Furthermore, in the aforementioned Step S210, when the registration sensor 17 does not detect the tip end of the document even after the predetermined time elapses (Step S214 in FIG. 7B), the sensor 17 judges that the reason is the registration nonarrival jamming and transmits a signal to the main body control section 102 (Step S215 in FIG. 7B).

According to the first embodiment, since the speed of conveying the document to the contact glass 22 of FIG. 1 in the one-side surface reading-out mode is controlled such that the speed becomes higher than that in the both surfaces reading-out mode, in case that the fixed reading-out medium (fixed reading-out section 14) of the fixed position for reading out the rear surface of the document is located at a more upstream side in the document conveying direction than that of the contact glass 22 or at a more downstream side in the document conveying direction, in the one-side surface reading-out mode when only the front surface of the document is read out, the time required from the document feeding till the termination of the reading-out operation can be shortened. As a result, the productivity of the image reading-out can be improved.

Also, according to the first embodiment, since the document stopping position in the both surfaces reading-out mode (previous taking-out position) is established to the more downstream position than that in the one-side surface reading-out mode and the position can be changed in accordance with the mode setting (Steps S207 in FIG. 7A through S210 in FIG. 7B), the lowering of the productivity due to the difference of the mode can be avoided.

Furthermore, according to the first embodiment, at the time of the thin paper mode, the direction of the image surface setting on the one-side surface document is changed from the upper-side direction to the lower-side direction and the image is read out by the fixed reading-out section 14 (Steps S101 through S104 in FIG. 6). Therefore, the paper conveying operation and the image reading-out operation can be suitably changed in accordance with the paper quality. Since the document employed in the thin paper mode is very thin to the extent that the exposing light is passed therethrough, when the image on the paper is read out by the scanner in the image reading-out apparatus main body, if the white plate serving as the background plate (conveying belt 18 in FIG. 1) is dirty, the image quality is lowered. The surface of the conveying belt 18 is made of a substance such as rubber. Therefore, it is difficult to clean the surface of the conveying belt to remove dirt or soil. For this reason, the fixed reading-out section 14 including a slit-state white plate instead of the scanner, which can be easily cleaned, reads out the image on the document, in order to improve the image quality.

Regardless of the first embodiment, the number of the document pages (or whether the final page number is odd or even) is previously established, in the both surfaces reading-out mode, by the operating section 103. When the number of pages is odd, the rear surface of the final document is not read out. At this time, it is possible to perform the control operation such that the document is accelerated and conveyed on the contact glass 22. On this occasion, the acceleration control is done on the basis of Steps 20 through 22 shown in FIG. 5B.

Furthermore, regardless of the first embodiment, it may be allowable to perform the control operation such that, after the document passes through the fixed reading-out section 14, the document is accelerated and conveyed onto the contact glass 22. Owing to such control operation, the document can be rapidly set onto the contact glass 22.

Thereby, the processing time can be shortened. On this occasion, after the registration sensor 17 detects the tip end of the document and the document is conveyed by a predetermined distance [motor pulse counting value=a predetermined value], the speed of conveying the document by use of the reading-out roller 16 and/or the conveying belt 18 is accelerated. Otherwise, after the rear end of the document is detected by the registration sensor 17, the document conveying speed by the conveying belt 18 is accelerated.

Second Embodiment

Figure 8:
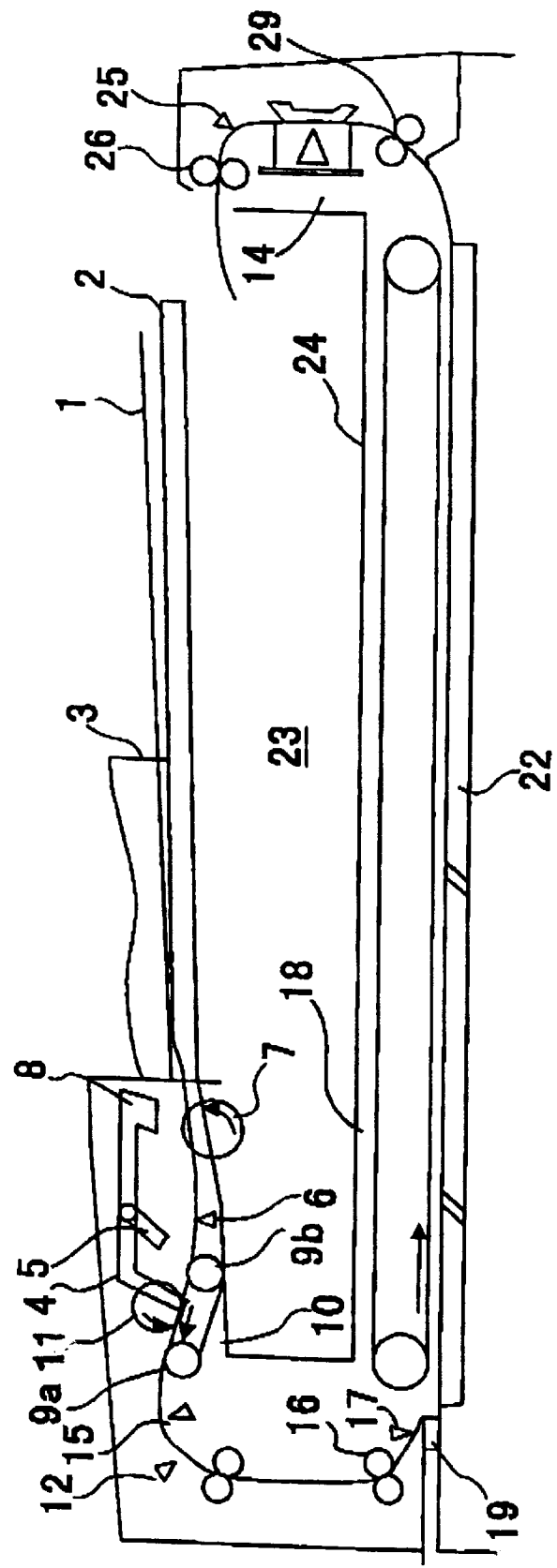
FIG. 8 is an outlined cross-sectional view illustrating an overall structure of a two-sided reading-out apparatus of the second embodiment according to the present invention.

FIG. 8 is an outlined cross-sectional view illustrating the entire structure of the two-sided reading-out apparatus of the second embodiment according to the present invention. The same reference numeral is attached to the same part as that of the first embodiment, and the explanation thereof is omitted.

In the second embodiment, since the image data on the front and rear surfaces of the document are read out without overlapping, the fixed reading-out section 14 is disposed on the document discharging path after passing over the contact glass 22. Regarding the direction of the image surface at the time of putting the document on the document stand 2, the first surface (front surface) faces upward and the document is called out from the lower surface of the document bundle 1 by the calling-out roller 7. Consequently, in general, the first surface is read out by use of the scanner (not shown) in the image forming apparatus main body, and the second surface (rear surface) is read out by use of the fixed reading-out section 14.

The fixed reading-out section 14 is disposed at the downstream side of the contact glass 22, while a reading-out roller 29 is disposed on the place in the vicinity of the upstream of the fixed reading-out section 14. The document conveyed from the place on the contact glass 22 is fed to the fixed reading-out section 14.

A document discharging sensor 25 is constructed as an optical reflection-type sensor, etc., takes a timing of decreasing the conveying speed at the time of discharging the document, and detects the paper jamming at the time of conveying the document.

A document discharging roller 26 conveys the document after passing through the fixed reading-out section 14 onto a document discharging tray 24 and discharges the document therefrom. The conveying speed of the document discharging roller 26 is decreased at the time of discharging the document, and thereby the property of stacking the document on the paper discharge tray 23 can be improved.

According to the second embodiment, the fixed reading-out section 14 is disposed on the document discharging path after the documents pass over the contact glass 22. In case of a size different from that of the preceding document size, the document size is detected in the process of conveying the separated document onto the contact glass 22 and the detected size is transmitted to the main body control section 102. In the control section 102, the scanning speed of the scanner in the image forming apparatus main body and/or the document conveying speed of the fixed reading-out section 14 can be calculated. The sheet-through reading-out speed (in the case of reading out the second surface in the both surfaces reading-out mode) or the sheet-through speed of the paper passing is established on the basis of the speed of conveying the document to the fixed reading-out section 14.

Furthermore, in the case of setting upward the document surface direction in the one-side surface reading-out mode, the conveying speed of the document after reading out the image by use of the scanner in the image forming apparatus (conveying speed at the time of passing through the fixed reading-out section 14) is accelerated, and the document thus accelerated is discharged therefrom. Furthermore, in the case of setting the document downward in the one-side surface reading-out mode, the conveying speed is accelerated until the arrival at the fixed reading-out section 14, and the document thus accelerated is conveyed to the subsequent stage.

Furthermore, as in the case of the first embodiment, the preliminary conveying position is changed in the one-side surface reading-out mode and in the both surfaces reading-out mode. Furthermore, the number of pages of the document put on the document stand 2 is previously set into the RAM, etc., in the main body control section 102 by performing the input operation of the operating section 103. When the final document ends at the odd-number page (first surface) in the both surfaces reading-out mode, the even-number page (second surface) of the final document is not read out, and the acceleration control is performed such that the conveying speed for the fixed reading-out section 14 becomes higher than the conveying speed at the time of reading-out the second surface.

According to the second embodiment, it is not necessary particularly to provide the conveying path for detecting the size which results in the large-sized apparatus, and it is possible to realize the mixed carrying(piling) AMS mode utilizing the optical magnification/reduction processing.

Third Embodiment

Figure 9:
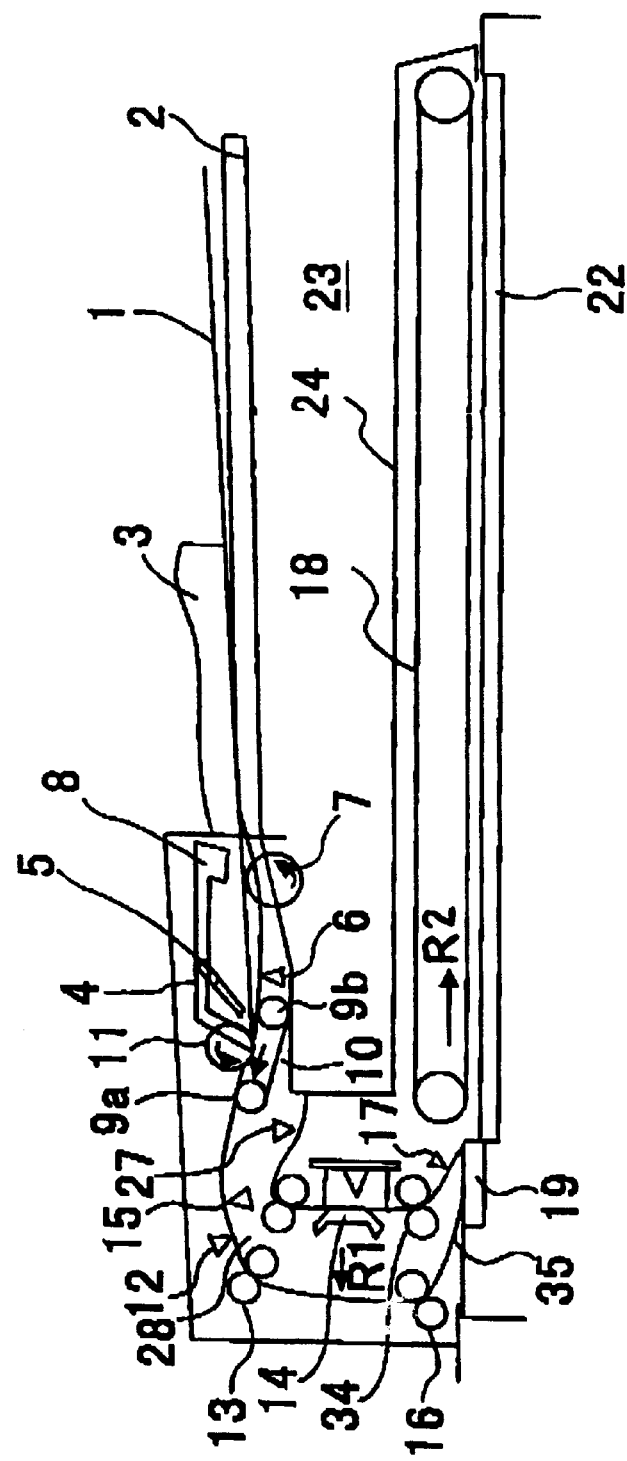
FIG. 9 is an outlined cross-sectional view illustrating an overall structure of a two-sided reading-out apparatus of the third embodiment according to the present invention.
Figure 10:
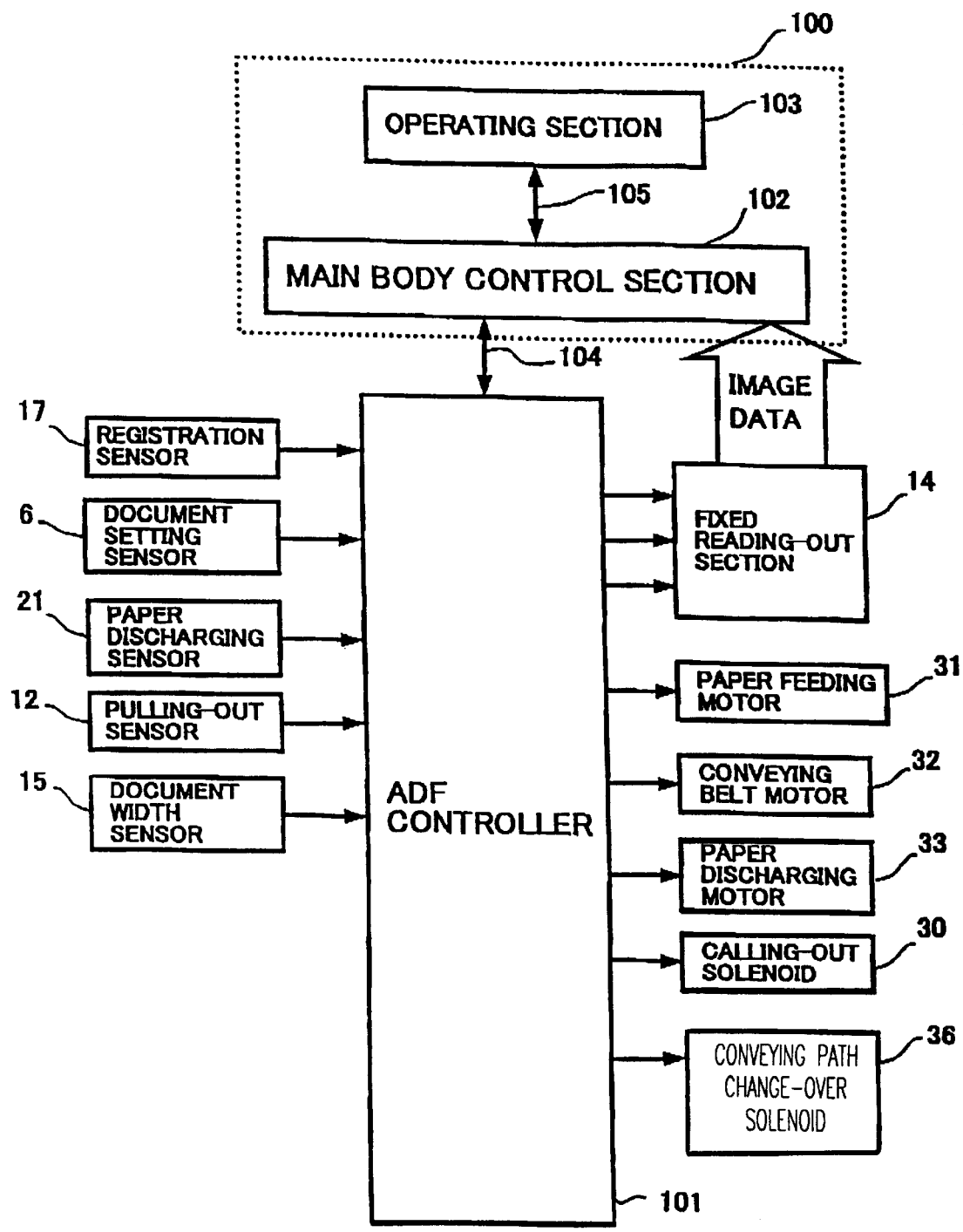
FIG. 10 is a block diagram illustrating an outlined structure of the control system shown in FIG. 9.
Figure 11A:
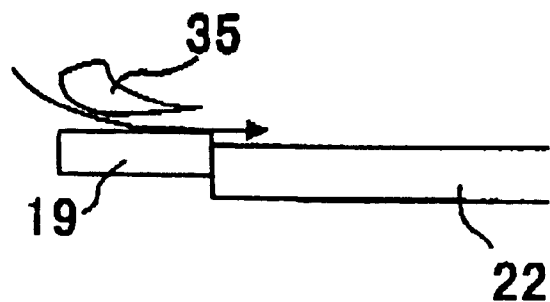
FIGS. 11A through 11C are views illustrating the operation of a changing-over claw provided in the vicinity of a contact glass shown in FIG. 9.
Figure 11B:
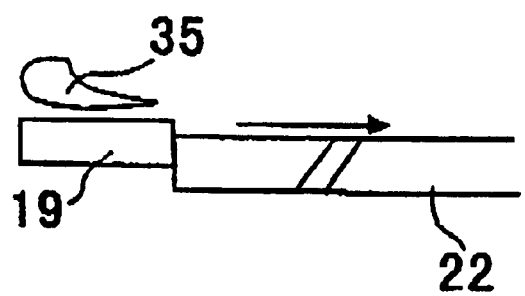
Figure 11C:
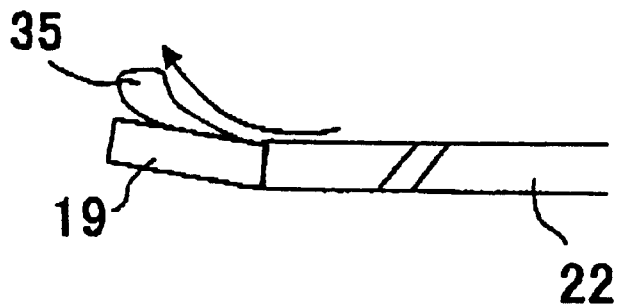

FIG. 9 is an outlined cross-sectional view illustrating an overall structure of the two-sided reading-out apparatus of the third embodiment according to the present invention. FIG. 10 is a block diagram illustrating an outlined structure of the control system in the same two-sided reading-out apparatus. FIGS. 11A through 11C are diagrams for explaining the operation of a changing-over claw 35 provided at the upstream side of the contact glass 22 in the apparatus shown in FIG. 9. The same reference numeral is attached to the same structure as that of the first embodiment, and the explanation thereof is omitted.

In the third embodiment, since the image data on the front and rear surfaces of the two-sided document are read out without overlapping, a first conveying route R1 starting at the document stand 2 arriving at the contact glass 22 via the separation mechanism and a second conveying route R2 starting at the contact glass 22 arriving at the document discharging tray 24 are respectively provided independently, and the fixed reading-out section 14 (not shown) is disposed on the second conveying route R2. Regarding the image surface direction at the time of piling the document on the document stand 2, in general, the direction of the first surface (front surface) is upward, and the document is called out from the lower surface of the document bundle 1 by use of the calling-out roller 7. Consequently, in general, the first surface is read out by the scanner (not shown) in the image forming apparatus main body and the second surface (rear surface) is read out by the fixed reading-out section 14.

The changing-over claw 35 is provided above the scale 19 at the upstream side (inlet side) in the conveying direction of the contact glass 22 in order to change over the direction of conveying the document to the first conveying path R1 or the second conveying path R2. The claw 35 is sucked (attracted) or released by a conveying path change-over solenoid 36 shown in FIG. 10.

The operation of the changing-over claw 35 is illustrated in FIGS. 11A through 11C. Namely, when the document after the separation/conveyance is conveyed onto the contact glass 22 along the first conveying path R1, the changing-over claw 35 stands on the upper position (home position) of the scale 19 as shown in FIG. 11A. Furthermore, as shown in FIG. 11B, when the document is conveyed from the contact glass 22 to the fixed reading-out section 14 on the second conveying path R2, the changing-over claw 35 is brought into pressurized contact with the scale 19 (constructed with the flexible material which can be bent) by the action of the sucking drive of the conveying path change-over solenoid 36. As shown in FIG. 11C, the claw 35 further pushes down the scale 19 from the upper surface of the contact glass 22.

The operation of the changing-over claw 35 shown in FIG. 11C is performed in order to eliminate the difference step between the contact glass 22 and the scale 19 and to avoid the conveyance jamming occurring when the document advances to the second conveying path R2 shown in FIG. 9.

A document discharging roller 28 is provided in FIG. 9 at the downstream side of the fixed reading-out section 14, and conveys and discharges the document after the fixed reading-out onto the document discharging tray 24.

A document discharging sensor 27 is provided in the vicinity of the discharging inlet (or outlet) of the document discharging tray 24 at the downstream side of the document discharging roller 28, and detects the document jamming.

A reading-out roller 34 is driven with the timing of the sucking drive owing to the action of the changing-over claw 35, and inserts the document into the fixed reading-out section 14.

Figure 13:
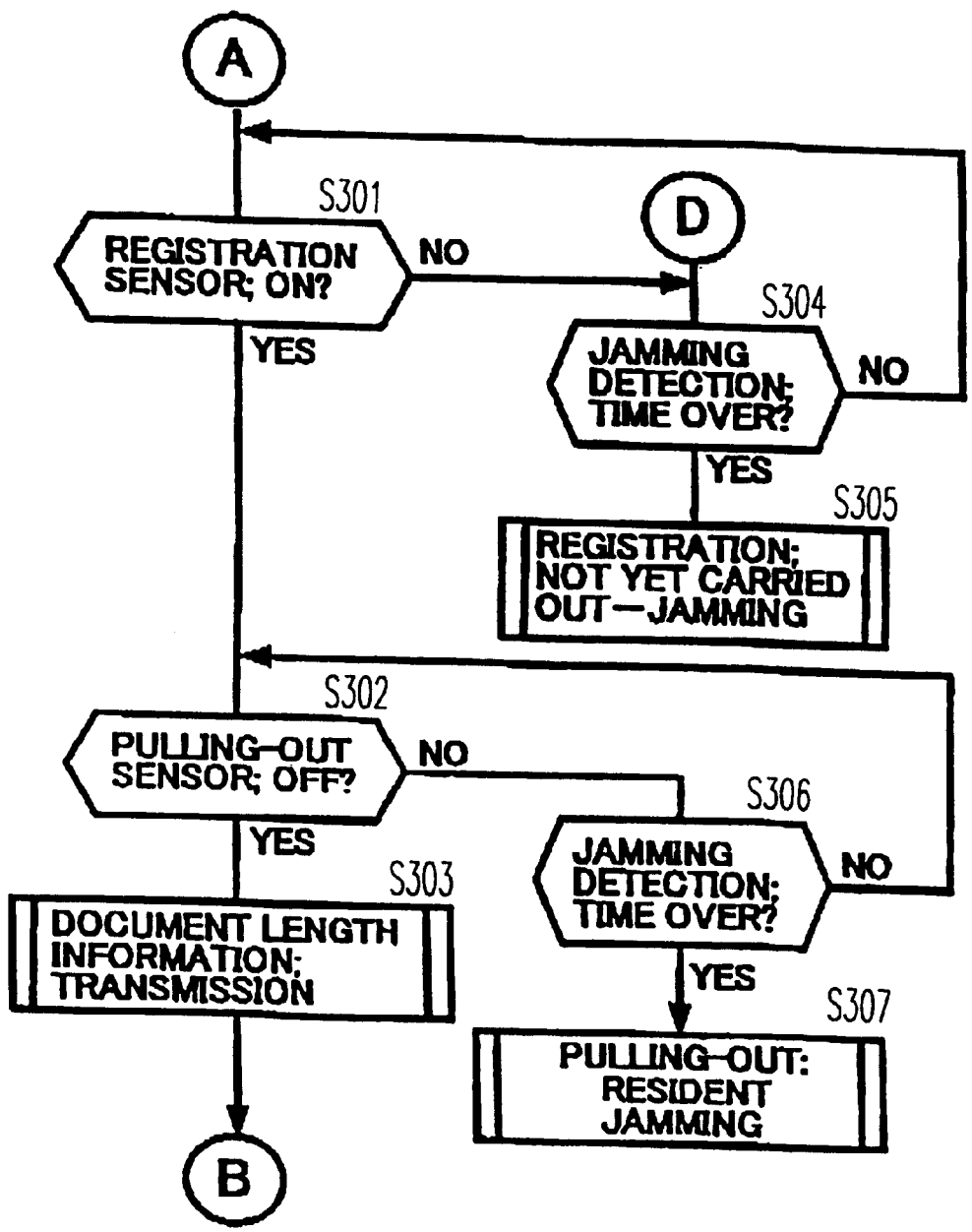
FIG. 13 is a flow chart illustrating an operation subsequent to the operation explained in FIG. 12.
Figure 14:
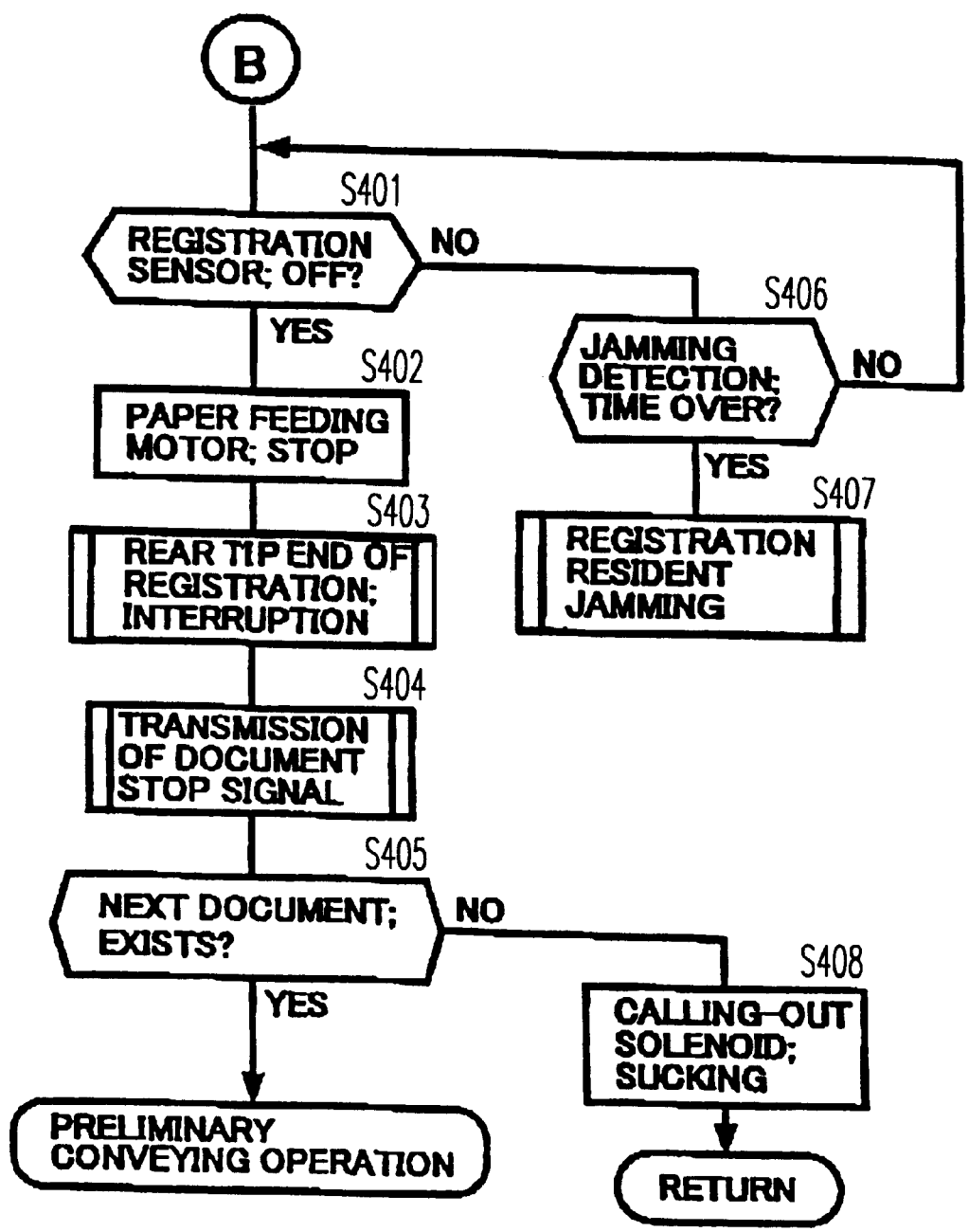
FIG. 14 a flow chart illustrating an operation subsequent to the operation explained in FIG. 13.

Next, the operations of reading-out and conveying the document in the third embodiment referring to the flow charts respectively shown in FIGS. 12 through 14.

The document bundle 1 is set upward on the document stand 2 such that the tip end portion of the document bundle 1 of same size impinges upon the document stopper 4. Usually, in the one-side surface reading-out mode, the image surface is set upward, while, in the both surfaces reading-out mode, the first page (front surface) is set upward. At this time, since the set sensor feeler 5 releases the light-intercepting state of the sensor 6 as mentioned before, the document setting signal is transmitted from the ADF control section 101 to the main body control section 102 via the I/F circuit 104 (Step S1 in FIG. 12).

Next, when a print key (not shown) provided on the operating section 103 is pushed (Step S2 in FIG. 12), one-side surface/both surfaces reading-out mode signal, reading-out magnification/reduction rate signal, and document feeding signal are transmitted from the main body control section 102 to the ADF controller 101. At this time, the document feeding operation is started.

Here, owing to the driving operation of the calling-out solenoid 30, the document stopper 4 moves back from the document setting surface, and at the same time the pressurizing lever 8 descends and comes into contact with the upper surface of the document bundle 1 (Step S3 in FIG. 12).

Next, owing to the drive of the paper feeding motor 31 in the counterclockwise (CCW) direction, the paper feeding belt 10 is suspended on the calling-out roller 7, the paper feeding belt driving roller 9a and the driven roller 9b are driven in the direction shown by an arrow in FIG. 9, and the lowermost document is separated from the document bundle 1 and fed to the subsequent stage (Step S4 in FIG. 12). Here, the preliminary conveying flag is turned ON (Step S5 in FIG. 12).

Next, when the size of the separated document in the width direction thereof is detected by the document width sensor 15 disposed in the vicinity of the pulling-out sensor 12, the document width size signal is transmitted to the main body control section 102 (Steps S6 and S7 in FIG. 12). Furthermore, the tip end of the document is detected by the pulling-out sensor 12, and at the same time the document length counting is started (Steps S8 and S9 in FIG. 12). At this time, the document reading-out width and the document size at the time of the fax transmission are settled.

Furthermore, after a predetermined number of pulses (or a predetermined time) elapses from the time point of detecting the tip end of the separated document, when the driving direction of the document feeding motor 31 in FIG. 10 is reversed, the pulling-out roller 13 and the reading-out roller 16 start to rotate in FIG. 9. Furthermore, the conveying belt 18 rotates in the direction shown by the arrow by the driving force of the conveying belt motor 32 in FIG. 10. Since the paper feeding belt 10 and the calling-out roller 7 in FIG. 9 are not driven due to the reversed rotation of the paper feeding motor 31, the document is fed onto the contact glass 22 by the cooperation of the pulling-out roller 13, the reading-out roller 16, and the conveying belt 18 with the conveying speed (Steps S10 through S12 in FIG. 12).

Furthermore, in the aforementioned Step S8, when the pulling-out sensor 12 cannot detect the tip end of the document even after the predetermined time elapses, the sensor 12 judges that the reason is the pulling-out nonarrival jamming and transits a signal to the main body control section 102 (Steps S23 and S24 in FIG. 12).

Next, after the front and rear ends of the document are detected by the registration sensor 17, when the rear end of the document is detected by the pulling-out sensor 12 (Steps S301 and S302 in FIG. 13), the document length is calculated from the value counted by the document length counter and the length thus counted is transmitted to the main body control section 102 (Step S303 in FIG. 13).

Moreover, in the aforementioned Step S301, when the registration sensor 17 cannot detect the tip end of the document even after the predetermined time elapses, the sensor 17 judges that the reason is the registration nonarrival jamming and transmits a signal to the main body control section 102 (Steps S304 and S305 in FIG. 13).

In the aforementioned Step S304, when the pulling-out sensor 12 cannot detect the rear end of the document even after predetermined time elapses, the sensor 12 judges the reason to be pulling-out sensor resident jamming and transmits a signal to the main body control section 102 (Steps S306 and S307 in FIG. 13).

Next, when the rear end of the document is detected by the registration sensor 17 (Step S401 in FIG. 14), the document feeding motor 31 is stopped. At the same time, in the processing of the registration rear end interruption, the document is conveyed such that the rear end of the document overruns on the scale 19, and thereafter the conveying belt 18 is inversely driven and thereby the rear end portion collides with the scale 19. In this way, the skewing compensation is done.

When the document is stopped on the position of the scale 19, the document transmits the document stopping signal to the main body control section 102. Then, the image on the first surface of the document is read out by the scanner in the image forming apparatus main body 102. Thereafter, the lowermost sheet of the document of the document bundle 1 is read out in order (Steps S402 through S404 in FIG. 14).

During that time, the next document on the document stand 2 is preliminarily conveyed to the pulling-out roller 13. When the next document does not exist (Step S405 in FIG. 14), the calling-out solenoid 30 is actuated to the side of sucking, and thereby the document stopper 4 descends (Step S408 in FIG. 14). Then, the pressurizing lever 8 is raised up, and thereby the document bundle 1 is enabled to be set.

Moreover, since the downward-direction setting is previously designated when the thin-paper mode is set, the aforementioned skewing compensation is not performed. After stopping the document on the scale position, the document is guided from the upper surface of the contact glass 22 to the second conveying path R2 in FIG. 9 by the actions of the changing-over by the claw 35 and the inverse-direction drive by the conveying belt 18. At this time, the first surface (front surface) of the document opposing the fixed reading-out section 14 is read out.

Figure 15A:
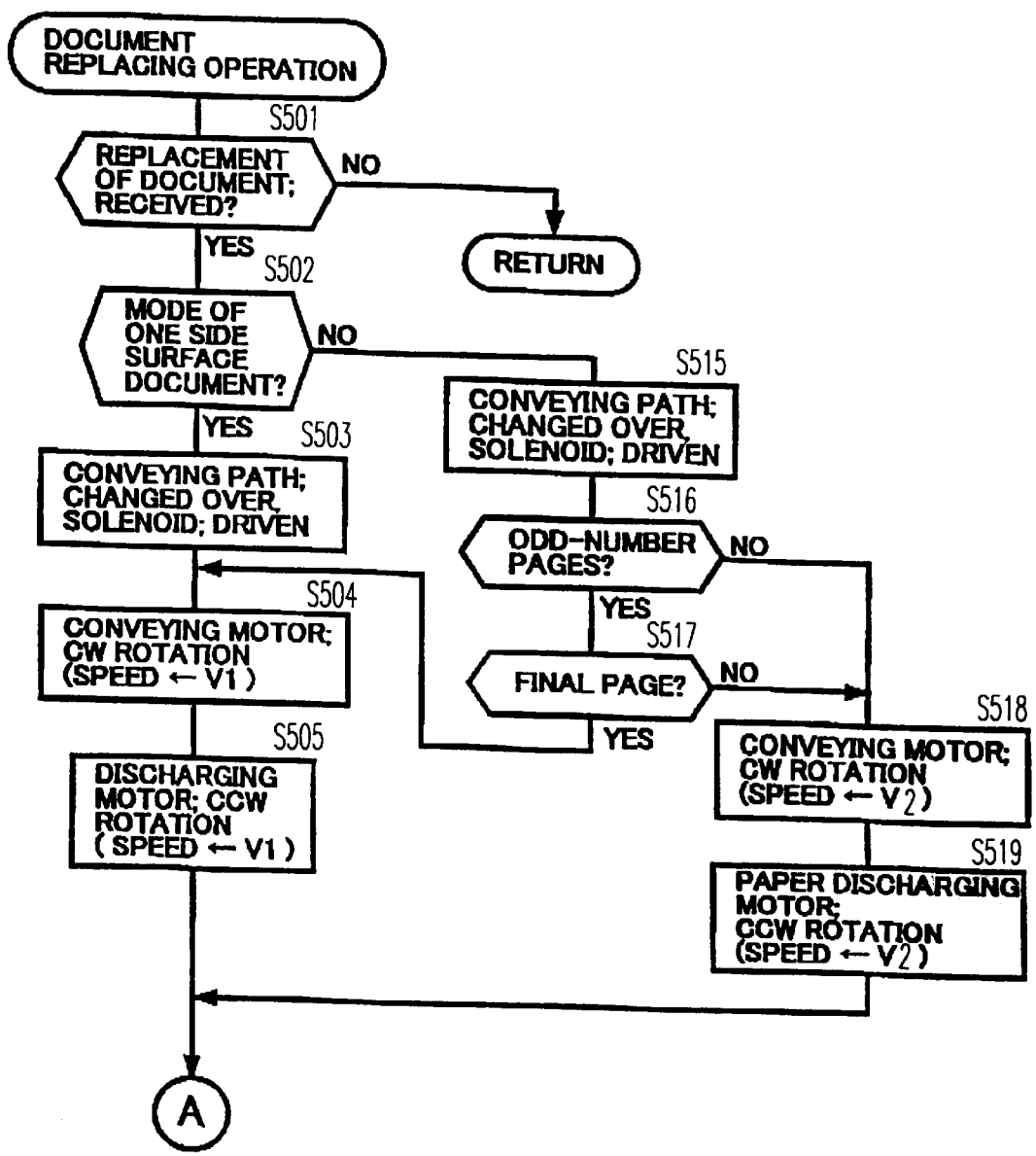

Next, the operation of exchanging the document in the third embodiment of the invention is described hereinafter, referring to the flow charts respectively shown in FIGS. 15A, 15B and 16.

In the case of the one-side surface reading-out mode, the image on the document fed onto the contact glass 22 is read out by the action of the scanner driving in the image forming apparatus main body. After finishing the reading-out operation thereof, on the basis of the document discharging signal transmitted from the main body control section 102 (Step S501 in FIG. 15A), the changing-over claw 35 is moved from the home position to the side of the scale 19 by the action of the sucking drive by the conveying path change-over solenoid 36 in FIG. 10 (Step S503 in FIG. 15A), and the rotating direction of the conveying belt 18 is inversed. Thereby, the belt 18 is driven in the direction opposite to that shown by the arrow in FIG. 9, and at the same time, by driving the paper discharging motor 33 in FIG. 10, the reading-out roller 34 and the document discharging roller 28 are both driven (Steps S504 and S505 in FIG. 15A). On this occasion, an ordinary speed $V_1$ is established corresponding to the reading-out inherent in the fixed reading-out section 14.

Furthermore, in case that the final page is an even-numbered page in the two-sided reading-out mode, after reading out the first surface of all pages by the scanning operation of the scanner in the image forming apparatus main body, the second surface reading-out start signal is transmitted from the control section 102. Thereby, the changing-over claw 35 is moved from the home position to the side of the scale 19 by the action of the sucking drive by the conveying path change-over solenoid 36 (Step S515 in FIG. 15A). The document is conveyed to the fixed reading-out section 14 by the actions of the inversed rotation of the conveying belt 18 and the drive of the reading-out roller 34 and the document discharging roller 28 with a conveying speed $V_2$. The conveying speed $V_2$ is slower than the ordinary speed $V_1$. For instance, the conveying speed $V_2$ is set to a speed equal to the scanning speed of the scanner in the image forming apparatus main body (Steps S516 through S519 in FIG. 15A). Moreover, in case that the final page is the odd-numbered page in the both surfaces reading-out mode, since it is not necessary to read out the second surface of the final document, the document is conveyed with the ordinary speed $V_1$ as mentioned before (Steps S504 and S505 in FIG. 15A).

Next, when the registration sensor 17 detects the tip end of the document (Step S506 in FIG. 15B), the conveying belt motor 32 in FIG. 10 starts the operation of counting the pulses (F-gate count) (Step S507 in FIG. 15B). In the case of the both surfaces reading-out mode, when the counting value arrives at a predetermined value, the F-gate signal indicating the start of the reading-out operation is turned ON (Steps S508 and S509 in FIG. 15B).

Next, when the registration sensor 17 detects the passage of the document rear end (Step S511 in FIG. 15B), and the aforementioned count value arrives at the predetermined value, the F-gate signal indicating the end of the reading-out operation is turned OFF in the case of the both surfaces reading-out mode (Steps S512 through S514 in FIG. 15B).

Moreover, in the aforementioned Step S506, when the registration sensor 17 cannot detect the tip end of the document even though the predetermined time elapses, the sensor 17 judges that the reason may be the registration nonarrival jamming and transmits a signal to the main body control section 102 (Steps S520 and S521 in FIG. 15B).

Furthermore, in the aforementioned Step S511, when the registration sensor 17 cannot detect the rear end of the document even after the predetermined time elapses, the sensor 17 judges the reason may be the registration sensor resident jamming and transmits a signal to the main body control section 102 (Steps S522 and S523 in FIG. 15B).

Furthermore, during the reading out of the first surface, the next document has been preliminarily conveyed onto the position of the reading-out roller 16 by the actions of the separation due to the pickup operation and the drive by the paper feeding motor 31. Thereafter, the paper feeding motor 31 and the conveying belt motor 32 of FIG. 10 are inversely driven and both are accelerated by detecting the document rear end by use of the registration sensor 17. Thereby, reading out the second surface or discharging the document having the already read-out first surface, the next document is conveyed onto the contact glass 22 in order to prepare the reading-out of the first surface thereof (Steps S524 and S525 in FIG. 15B).

Figure 16:
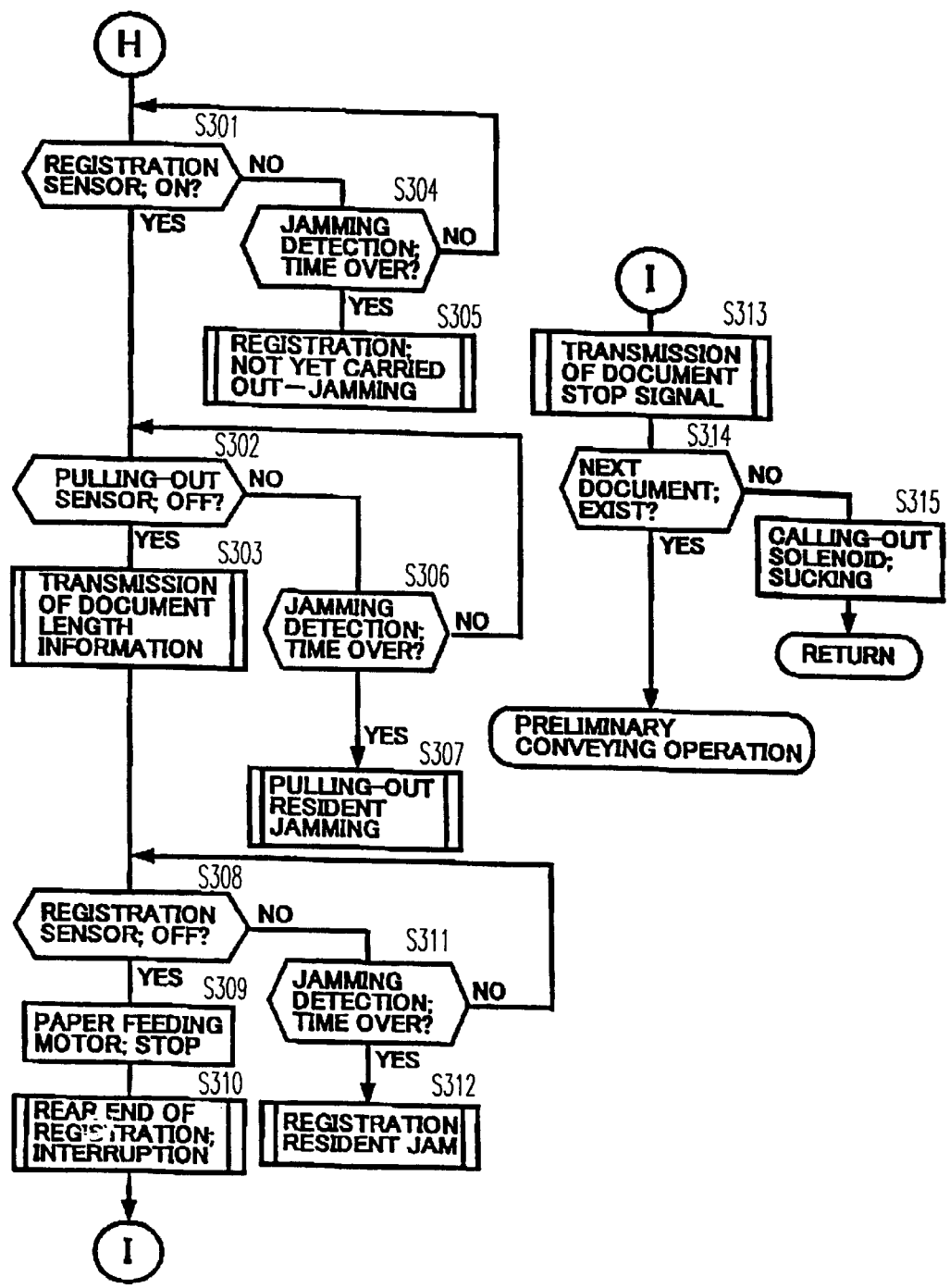
FIG. 16 is a flow chart illustrating an operation subsequent to the operation shown in FIG. 15.

Next, after detecting the front and rear ends by use of the registration sensor 17, when the rear end of the document is detected by the pulling-out sensor 12 (Steps S301 and S302 in FIG. 16), the document length is calculated from the counting value of the document length, and the value thus counted is transmitted to the main body control section 102 (Step S303 in FIG. 16).

Moreover, in the aforementioned Step S301, when the registration sensor 17 cannot detect the tip end of the document even after the predetermined time elapses, the sensor 17 judges the reason to be the registration nonarrival jamming and transmits a signal to the main body control section 102 (Steps S304 and S305 in FIG. 16).

Furthermore, in the aforementioned Step S302, when the pulling-out sensor 12 cannot detect the rear end of the document even after the predetermined time elapses, the sensor judges the reason to be the pulling-out sensor resident jamming and transmits a signal to the main body control section 102 (Steps S306 and S307 in FIG. 16).

Next, when the document rear end passage is detected by the registration sensor 17 (Step S308 in FIG. 16), in the ordinary mode, the document is conveyed such that the rear end of the document overruns the scale 19, and then the conveying belt 18 is driven in inverse direction and the skewing compensation is performed. Thereafter, the paper feeding motor 31 is stopped and the speed of the conveying belt motor 32 is decreased with the rear end interrupting process (Steps S309 and S310 in FIG. 16). Then, the document stopping signal is transmitted to the main body control section 102 after transmitting the predetermined number of pulses (Step S313 in FIG. 16). Here, the image on the first surface of the document by use of the scanner in the main body of the image forming apparatus and thereafter the lowermost document of the document bundle 1 is read out in order.

Furthermore, the next document on the document stand 2 is preliminarily conveyed to the pulling-out roller 13. When the next document does not exist (Step S314 in FIG. 16), the calling-out solenoid 30 is actuated to the sucking side and thereby the document stopper 4 descends (Step S315 in FIG. 16). Then, the pressurizing lever 8 is raised up and the document bundle 1 is put in the state of enabling it to set.

Moreover, in the aforementioned Step S304, when the registration sensor 17 cannot detect the rear end of the document after the predetermined time elapses, the sensor 17 judges the reason to be the registration resident jamming and transmits a signal to the main body control section 102 (Steps S311 and S312 in FIG. 16).

Next, the preliminary conveying operation in the third embodiment is described referring to the flow chart shown in FIG. 17.

When the next document is set on the document stand 2, the paper feeding motor 31 is driven in the counterclockwise (CCW) direction, and the calling-out roller 7 and the paper feeding belt 10 are rotatively driven in the direction of the arrow in FIG. 9. The next lowermost document is separated from the document bundle 1 and fed therefrom (Step S601 in FIG. 17). Here, the preliminary conveying flag is turned ON (Step S602 in FIG. 17).

Next, when the tip end of the document arrives at the document width sensor 15 (Step S603 in FIG. 17), the width size information is transmitted to the main body control section 102 (Step S604 in FIG. 17). The document is conveyed until the tip end of the document is detected by the pulling-out sensor 12 (Step S605 in FIG. 17). Here, the document length counting is started at the same time when the tip end of the document is detected by the pulling-out sensor 12 (Step S606 in FIG. 17).

Next, the paper feeding motor 31 is driven in the inverse direction, and the document is conveyed until the tip end of the document is detected (Step S607 in FIG. 17). In this way, the preliminary document feeding operation is ended (Step S608 in FIG. 17).

Moreover, in the aforementioned Step S605, when the pulling-out sensor 12 cannot detect the tip end of the document even after the predetermined time elapses, the sensor judges the reason to be the pulling-out sensor non-arrival jamming and transmits a signal to the main body control section 102 (Steps S609 and S610 in FIG. 17).

Furthermore, in the aforementioned Step S607, when the registration sensor 17 cannot detect the tip end of the document even after the predetermined time elapses (Steps S611 and S612 in FIG. 17), the sensor 17 judges the reason to be the registration resident jamming and transmits a signal to the main body control section 102.

Next, although it is not illustrated in detail in the drawing, the reading-out and conveying operations of the both surfaces/mixed piling AMS (paper size designation for magnification/reduction) are described hereinafter.

In the case of the both surfaces/mixed piling mode, since documents of different sizes are mixedly piled on the document stand 2, when, after the documents are separated sheet by sheet, the size of one document is different from that of the previous document, it is necessary to calculate again on every occasion the scanning speed of the scanner in the image forming apparatus main body and the document conveying speed at the fixed reading-out section 14 and give the speed instruction. Consequently, the document size detected at the time of conveying the document onto the contact glass 22 is transmitted to the main body control section 102 on the basis of the speed of conveying the document to the fixed reading-out section 14 which is calculated in the main body control section 102. The sheet through reading-out speed is established and thereby the second surface is read out.

Furthermore, in the case of the AMS mode concerning the same-size document, since the document bundle 1 to be set on the document stand 2 is of same size, on the basis of the size of the document detected at the time of separating and feeding the first document and the size of the transfer paper selected by the operating section 103, the magnification/reduction rate of reading out the document is calculated in the main body control section 102. Thereby, the scanning speed of the scanner in the image forming apparatus main body and the document conveying speed are determined and the speed instruction is given for the aforementioned scanner and ADF.

In the third embodiment in FIG. 9, since the first conveying path R1 from the document stand 2 to the contact glass 22 and the second conveying path R2 from the contact glass 22 to the document discharging tray 24 via the fixed reading-out section 14 are respectively provided independently, and the direction of conveying the document is changed over by the changing-over claw 35, the image data on the front and rear surfaces of the document can be read out without any overlapping. Thus, the document size can be surely decided at the first conveying path R1 from the document stand 2 to the contact glass 22. The first conveying path R1 and the second conveying path R2 are arranged approximately in parallel. Thereby, the apparatus can be prevented from becoming large-sized. In addition, it may be possible to realize the mixed piling AMS mode utilizing the optical magnification/reduction rate processing.

Furthermore, the two-sided reading-out apparatus, as described in the second and third embodiment, can be constructed such that the apparatus is carried in the image forming apparatus having the mixed piling AMS mode. Utilizing the optical magnification/reduction, the documents of different sizes piled on the document stand 2 are read out with the reading-out magnification/reduction rate corresponding to the previously designated transfer paper size and the image is formed on the designated transfer paper.

The document stand 2, constitutes the document piling medium. The scanner in the image forming apparatus main body is the moving reading-out medium. The fixed reading-out section 14 is the fixed reading-out medium. The document discharging tray 24 is the document discharging medium. The reading-out roller 16 and the conveying belt 18 are the conveying medium. The changing-over claw 35 is the changing-over medium. The ADF controller 101 and the main body control section 102 are the preliminary conveying control medium. The main body control section 102 and the operating section 103 are either one of the reading-out surface setting medium, the image existence/nonexistence setting medium, and the thin-paper mode setting medium.

SUMMARIZED DESCRIPTION OF THE FIRST THROUGH THIRD EMBODIMENTS

As it is apparent from the foregoing description, according to the first aspect of the present invention, the two-sided reading apparatus is provided with the preliminary conveyance control medium for performing the preliminary conveyance, namely, previously conveying the next document before ending the reading-out of the preceding document of the plural documents and causing the document to wait in the vicinity of the upstream of the fixed reading-out medium or the movable reading-out medium, and the reading-out surface setting medium for setting the reading-out operation of reading out the one-side surface or the other-side surface or the both-side surfaces of the separated and conveyed document. Since the preliminary conveyance control medium changes the waiting position in accordance with the setting of the reading-out surface setting medium, the preliminary conveying position (previously the taking-out position) of the next document is changed over correspondingly to the document surface to be read out, and thereby the loss of the productivity caused by the difference of the image reading-out mode can be avoided. In addition, the required time from the feeding of the document after the ending of the document reading-out can be shortened.

According to the second aspect of the present invention, the two-sided reading-out apparatus is provided with the thin paper mode setting medium for setting the thin paper mode of reading out the document which is thinner than the predetermined paper thickness and has the image only on the one-side surface, and the ordering medium for ordering the direction of piling the document. When the thin paper mode is set, the ordering medium orders piling the document such that the image surface of the document opposes the fixed reading out medium, and at the same time the document is read out by the fixed reading-out medium. Consequently, the reading out medium is selected in accordance with the paper thickness, and the productivity and the reliability (based on the stable image reading-out quality) can be improved.

According to the third aspect of the present invention, the apparatus is provided with the image existence/nonexistence for setting the existence/nonexistence of the image information on the rear surface of the final document among the documents piled on the document piling medium. When the nonexistence of the image on the rear surface of the final document is set by the image existence/nonexistence setting medium, the reading-out of the image on the rear surface of the document by the fixed reading-out medium is prohibited. The speed of the final document passage through the fixed reading-out medium is made higher than that at the time of performing the image reading-out by use of the fixed reading-out medium. Consequently, the conveying speed of the final page of the document not to be read out because there is no image is changed over to high speed, and thereby the loss of the productivity of reading out the document with the operational mode can be avoided.

According to the fourth aspect of the present invention, the apparatus is provided with the reading-out surface setting medium for setting the reading-out of the one-side surface, or the other-side surface, or the both-side surfaces of the document. When the reading-out of both side surfaces of the document is set by the reading-out surface setting medium, after the passage of the rear end of the document through the fixed reading-out medium, the conveying medium conveys the document with the higher speed than the conveying speed for the document being read out by the fixed reading-out medium and stops the document on the predetermined position. Consequently, after reading out the document, it is possible to change over the conveying speed of the next document onto the contact glass to the higher conveying speed. In addition, the time interval from the end of the fixed reading-out till the start of the movable reading-out can be shortened, and thereby the productivity can be improved.

According to the fifth aspect of the present invention, the apparatus is provided with the movable reading-out medium disposed at the downstream side of the document piling medium in the document conveying direction for reading out the image information on the one-side surface of the document stopped on the predetermined position, the fixed reading-out medium disposed at the downstream side of the movable reading-out medium in the document conveying direction for reading out the image information on the other-side surface opposing the one-side surface of the document being conveyed, and the conveying medium for separating sheet by sheet the plural sheets of the document on the document piling medium and conveying the separated sheet to the fixed reading-out medium via the aforementioned predetermined position.

In such structure, the image on both side surfaces of the document can be read out without superposing the image data. The reading-out is precedingly done by the movable reading-out medium and the document size can be easily determined surely. Consequently, in the AMS mode at the time of mixedly piling the two-sided document of different sizes, the image can be effectively read out. Furthermore, it is sufficient to prepare only one system of the image processing circuit in the image forming apparatus, and the productivity for the two-sided document can be improved without any large-scale cost run-up.

According to the sixth aspect of the present invention, the movable reading-out medium is provided with the contact glass for piling the document thereon. The document comes from the one side of the contact glass to the fixed reading-out section. Consequently, the paper feeding and guiding direction comes in one direction, and thereby the document can be effectively exchanged with the other document.

According to the seventh aspect of the present invention, the document coming from the document piling medium is fed from the one-side of the contact glass, and the document thus fed is conveyed from the aforementioned one side of the contact glass to the fixed reading-out medium. Consequently, it is possible to provide the second document conveying on the inner side of the first conveying path. The document discharging section and the fixed reading-out section are arranged on the one side of the contact glass, and thereby the apparatus can be prevented from becoming large-sized.

According to the eighth aspect of the present invention, the apparatus is provided with the changing-over medium for changing over to each other the first conveying path extending from the document piling medium to the contact glass and the second conveying path extending from the contact glass to the document medium via the fixed reading-out medium and formed on the inner side of the first conveying path. The fixed reading-out medium is further provided on the inner side of the document feeding path, and in such structure the document can be discharged from the lower portion of the document piling medium.

According to the ninth aspect of the present invention, when the reading-out on the one-side surface of the document is established by the reading-out surface setting medium, since the conveying speed of the document at the time of the document passage through the movable reading-out medium is made higher than the conveying speed of the document at the time of reading out the document by the movable reading-out medium, the conveying speed made by use of the fixed reading-out medium is set to a high speed value when the second surface reading-out is not performed. Consequently, the processing time of reading out the document can be shortened.

According to the tenth aspect of the present invention, when the nonexistence of the image on the rear surface of the final document is set by the image existence/nonexistence setting medium, the rear-surface image reading-out by the fixed reading-out medium is prohibited. Since the speed of the final document passage at the fixed reading-out medium is made higher than that at the time of reading out the image by the fixed reading-out medium, the conveying speed of the final page, the image on which is not read out, is changed over to high speed. Consequently, the loss of the productivity of reading out the document in accordance with the operation mode is avoided.

According to the eleventh aspect of the present invention, when the thin paper mode is set by the thin paper mode setting medium, the instruction medium orders piling the document such that the image surface of the document opposes the fixed reading-out medium, and at the same time the aforementioned document is read out by the fixed reading-out medium. Consequently, the reading-out medium is selected in accordance with the paper thickness, and it may be possible to improve the productivity and the reliability (stable image reading-out quality).

According to the twelfth aspect of the present invention, the apparatus is provided with the two-sided surface reading-out apparatus. In such structure, the apparatus is provided with the size ordering magnification/reduction mode of reading out the aforementioned document with the reading-out magnification/reduction corresponding to the previously designated transfer paper size. Consequently, the document size can be surely decided before starting the reading-out of the document. In this way, the size can be designated, and the AMS modification/reduction can be done effectively even at the time of piling the documents of mixed sizes. In addition, the processing time for reading out the document can be shortened.

As it is apparent from the foregoing description, according to the present invention, it is possible to make the two-sided reading-out apparatus and the image forming apparatus both capable of simplifying the processing at the time of reading out the image, respectively, in connection with the document one-side surface reading-out mode and the two side surfaces reading-out mode. Both are capable of avoiding large-scaling of the apparatus and the cost run-up of the apparatus, thereby securing optimum productivity.

The preferred embodiment of the present invention has been described heretofore. However, numerous additional modifications and variations of the present invention are possible in light of the above teachings. It is therefore to be understood that, within the scope of the appended claims, the present invention may be practiced otherwise than as specifically described herein.

This application claims benefit of priority under 35 U.S.C. §120 from Japanese Patent Application No. 11-107354 filed in the Japanese Patent Office on Apr. 15, 1999 and from Japanese Patent Application No. 12-72653 filed in the Japanese Patent Office on Mar. 15, 2000, the entire contents of which are incorporated herein by reference.

What is claimed is:

1. A two-sided reading-out apparatus comprising:
   original document piling means for piling thereon plural sheets of an original document so as to put upside a first surface of said original document, above a contact glass;
   moving and reading-out means for moving and reading out said first surface of said original document conveyed onto a predetermined position on said contact glass from said original document piling means and for stopping thereon said conveyed original document on said contact glass;
   fixed reading-out means for conveying the original document and reading out a second surface of said original document, below said original document piling means and above said contact glass;
   paper discharging means for discharging said original document conveyed through said fixed reading-out means, below said original document piling means and above said contact glass;
   paper conveying means for conveying said original document along a first conveying path from said original document piling means to said contact glass and directing said conveyed original document from said contact glass to said paper discharging means via said fixed reading-out means and for further conveying said original document along a second conveying path formed on an inner side of said first conveying path;
   changing-over means for changing over the conveying direction of said original document to said first conveying path or to said second conveying path; and
   paper conveyance controlling means for conveying said original document piled on said original document piling means onto said contact glass along said first conveying path by use of said paper conveying means and thereafter changing over a paper conveying direction to said second conveying path and thereby inversely driving said paper conveying means, and for conveying said original document from said contact glass to said paper discharging means via said fixed reading-out means.

2. A two-sided reading-out apparatus as defined in claim 1 further comprising:
   a belt brought into contact with an upper surface of said contact glass for conveying said original document piled on said contact glass; and
   detection means for detecting passage of a rear end of said original document on said belt;
   wherein said paper conveyance controlling means controls the paper conveyance such that, after reading out said first surface of a preceding original document with a two sided reading-out mode, when said belt is rotated in a reverse direction and thereby said preceding original document is conveyed from the upper surface of said contact glass to said second conveying path, the paper conveying direction is changed over to said first conveying path by said changing-over means when said detection means detects the passage of the rear end of said preceding original document on said belt, and said belt is positively rotated and accelerated at the same time, and a second original document is conveyed onto said contact glass.

3. A two-sided reading-out apparatus as defined in claim 2,
   having a mixed-designation optical magnification/reduction mode of piling original documents of different sizes on said original document piling means.

4. A two-sided reading-out apparatus as defined in claim 3,
   wherein said paper conveyance controlling means performs a control operation, such that a paper conveying speed with a one-side surface reading-out mode by use of said fixed reading-out means becomes higher than a paper conveying speed by use of said fixed reading-out means with the two sided reading-out mode.

5. A two-sided reading-out apparatus as defined in claim 4, further comprising:
   page-number setting means for inputting and setting page numbers of each of said original documents piled on said original document piling means;
   wherein said paper conveyance controlling means accelerates paper conveyance such that, when a final document ends on an odd-numbered page of said original document with the two sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

6. A two-sided reading-out apparatus as defined in claim 3, further comprising:
   page-number setting means for inputting and setting page numbers on each of said original documents piled on said original document piling means;
   wherein said paper conveyance controlling means accelerates paper conveyance such that, when a final document ends on an odd-numbered page of said original document with the two sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

7. A two-sided reading-out apparatus as defined in claim 2,
wherein said paper conveyance controlling means performs a control operation, such that a paper conveying speed with a one-side surface reading-out mode by use of said fixed reading-out means becomes higher than a paper conveying speed by use of said fixed reading-out means in case of reading out said second surface of the original document with the two sided reading-out mode.

8. A two-sided reading-out apparatus as defined in claim 7, further comprising:
page-number setting means for inputting and setting page numbers of said original document piled on said original document piling means;
wherein said paper conveyance controlling means accelerates paper conveyance such that, when a final document ends on an odd-numbered page of said original document with the two sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

9. A two-sided reading-out apparatus as defined in claim 2, further comprising:
page-number setting means for inputting and setting page numbers of said original document piled on said original document piling means;
wherein said paper conveyance controlling means accelerates paper conveyance such that, when a final document ends on an odd-numbered page of said original document with a two-sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

10. A two-sided reading-out apparatus as defined in claim 1,
having a mixed-designation optical magnification/reduction mode of piling original documents of different sizes on said original document piling means.

11. A two-sided reading-out apparatus as defined in claim 10,
wherein said paper conveyance controlling means performs a control operation, such that a paper conveying speed with a one-side surface reading-out mode by use of said fixed reading-out means becomes higher than a paper conveying speed by use of said fixed reading-out means with a two-side surfaces reading-out mode.

12. A two-sided reading-out apparatus as defined in claim 11, further comprising:
page-number setting means for inputting and setting page numbers of said original document piled on said original document piling means;
wherein said paper conveyance controlling means accelerates paper conveyance such that, when a final document ends on an odd-numbered page of each of said original documents with the two-side surfaces reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

13. A two-sided reading-out apparatus as defined in claim 10, further comprising:
page-number setting means for inputting and setting page numbers on each of said original documents piled on said original document piling means;
wherein said paper conveyance controlling means accelerates paper conveyance such that, when a final document ends on an odd-numbered page of said original document with a two-sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

14. A two-sided reading-out apparatus as defined in claim 1,
wherein said paper conveyance controlling means performs a control operation, such that a paper conveying speed with a one-side surface reading-out mode by use of said fixed reading-out means becomes higher than a paper conveying speed by use of said fixed reading-out means in case of reading out said second surface of the original document with a two-side surfaces reading-out mode.

15. A two-sided reading-out apparatus as defined in claim 14, further comprising:
page-number setting means for inputting and setting page numbers of said original document piled on said original document piling means;
wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

16. A two-sided reading-out apparatus as defined in claim 1, further comprising:
page-number setting means for inputting and setting page numbers of said original document piled on said original document piling means;
wherein said paper conveyance controlling means accelerates paper conveyance such that, when a final document ends on an odd-numbered page of said original document with a two-sided reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

17. A two-sided reading-out apparatus as defined in claim 16, further comprising:
   page-number setting means for inputting and setting page numbers of said original document piled on said original document piling means;
   wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

18. An image forming apparatus comprising a two-sided reading-out apparatus as defined in claim 1,
   having a mixed designation optical magnification/reduction mode in which original documents of different sizes are piled on said original document piling means, and utilizing the optical magnification/reduction mode, each one of said original documents is read out with a reading-out magnification/reduction corresponding to a previously designated size of transferring paper.

19. A two-sided reading-out apparatus comprising:
   original document piling means for piling thereon plural sheets of an original document so as to put upside a first surface of said original document, above a contact glass;
   fixed reading-out means disposed on a position at a more downstream side in an original document conveying direction than that of said contact glass, above said contact glass and below said original document piling means, for reading out a second surface of said original document at a time of conveying the original document;
   movable reading-out means for reading out said first surface of said original document conveyed from said original document piling means onto a predetermined position of said contact glass and stopped thereon at a time of moving said original document on said contact glass;
   paper conveying means for conveying said original document along a paper conveying path extending from said original document piling means to a position downstream of said fixed reading-out means along said contact glass; and
   paper conveyance controlling means for changing a preliminary conveying position for a second original document and waiting temporarily with a one-side surface mode of reading out only one side surface of said original document and with a two side surfaces mode of reading out both surfaces of said original document, before ending a reading-out of the original document.

20. A two-sided reading-out apparatus as defined in claim 19, having a mixed-designation optical magnification/reduction mode of piling original documents of different sizes on said original document piling means.

21. A two-sided reading-out apparatus as defined in claim 20,
   wherein said paper conveyance controlling means performs a control operation, such that a paper conveying speed with the one-side surface reading-out mode by use of said fixed reading-out means becomes higher than a paper conveying speed by use of said fixed reading-out means with the two side surfaces reading-out mode.

22. A two-sided reading-out apparatus as defined in claim 21, further comprising:
   page-number setting means for inputting and setting page numbers on each of said original documents piled on said original document piling means;
   wherein said paper conveyance controlling means accelerates paper conveyance such that, when a final document ends on an odd-numbered page of each of said original documents with the two-side surfaces reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

23. A two-sided reading-out apparatus as defined in claim 20, further comprising:
   page-number setting means for inputting and setting page numbers on each of said original documents piled on said original document piling means;
   wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out means becomes higher than a paper conveying speed in case of reading out the second surface of said final document by use of said fixed reading-out means.

24. A two-sided reading-out apparatus as defined in claim 19,
   wherein said paper conveyance controlling means performs a control operation, such that a paper conveying speed with the one-side surface reading-out mode by use of said fixed reading-out means becomes higher than a paper conveying speed by use of said fixed reading-out means in case of reading out said second surface of the original document with the two-side surfaces reading-out mode.

25. A two-sided reading-out apparatus as defined in claim 24, further comprising:
   page-number setting means for inputting and setting page numbers of said original document piled on said original document piling means;
   wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out the first surface of said final document by use of said fixed reading-out means becomes higher than a paper conveying speed in case of reading out the second surface of said final document by use of said fixed reading-out means.

26. A two-sided reading-out apparatus comprising:
   original document piling means for piling thereon plural sheets of a original document so as to put upside a second surface of said original document, above a contact glass;

fixed reading-out means disposed on a position at a more upstream side in an original document conveying direction than that of said contact glass, above said contact glass and below said original document piling means, for reading out a first surface of said original document at a time of conveying the original document;

movable reading-out means for reading out said second surface of said original document conveyed from said original document piling means onto a predetermined position of said contact glass and stopped thereon at a time of moving said original document on said contact glass;

paper conveying means for conveying said original document along a paper conveying path formed from said original document piling means onto the contact glass through said fixed reading-out means; and paper conveyance controlling means for changing a preliminary conveying position for conveying a second document and waiting temporarily with a one-side surface mode of reading out only one side surface of said original document and with a two-side surfaces mode of reading out both surfaces of said original document, before ending reading-out of the original document.

27. A two-sided reading-out apparatus as defined in claim 26, wherein said paper conveying path is structured such that a cross section thereof is formed in a shape of a Japanese letter "ヲ" (one-side opened rectangle), and the original document conveying direction at a time of separating said original document from said original document piling means and feeding the original document to a subsequent stage becomes reverse to the original document conveying direction on said contact glass.

28. A two-sided reading-out apparatus as defined in claim 22, wherein said paper conveyance controlling means performs a control operation such that, after said original document passes through said fixed reading-out means with the two-side surfaces reading-out mode, a paper conveying speed is accelerated and said original document is conveyed onto said contact glass with a speed thus accelerated.

29. A two-sided reading-out apparatus as defined in claim 28, wherein, when said original document is thinner than predetermined paper and an image is formed only on the first surface of said original document, the conveying direction of the first surface of said original document to be piled on said original document piling means is designated; and wherein said fixed reading-out means has a thinner paper mode of reading-out the first surface of said original document by use of said movable reading-out means.

30. A two-sided reading-out apparatus as defined in claim 28, further comprising:

page-number setting means for inputting and setting page numbers of said original document piled on said original document piling means;

wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out means becomes higher than a paper conveying speed in case of reading out the second surface of said final document by use of said movable reading-out means.

31. A two-sided reading-out apparatus as defined in claim 27, wherein, when said original document is thinner than predetermined paper and an image is formed only on the first surface of said original document, the conveying direction of the first surface of said original document to be piled on said original document piling means is designated; and wherein said fixed reading-out means has a thinner paper mode of reading-out the first surface of said original document by use of said movable reading-out means.

32. A two-sided reading-out apparatus as defined in claim 27, further comprising:

page-number setting means for inputting and setting page numbers of said original document piled on said original document piling means;

wherein said paper conveyance controlling means accelerate paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out means becomes higher than a paper conveying speed in case of reading out the second surface of said final document by use of said movable reading-out means.

33. A two-sided reading-out apparatus as defined in claim 26, wherein said paper conveyance controlling means performs a control operation such that, after said original document passes through said fixed reading-out means with the two-side surfaces reading-out mode, a paper conveying speed is accelerated and said original document is conveyed onto said contact glass with a speed thus accelerated.

34. A two-sided reading-out apparatus as defined in claim 33, wherein, when said original document is thinner than predetermined paper and an image is formed only on the first surface of said original document, the conveying direction of the first surface of said original document to be piled on said original document piling means is designated; and wherein said fixed reading-out means has a thinner paper mode of reading-out the first surface of said original document by use of said movable reading-out means.

35. A two-sided reading-out apparatus as defined in claim 33, further comprising:

page-number setting means for inputting and setting page numbers of said original document piled on said original document piling means;

wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out means becomes higher than a paper conveying speed in case of reading out the second surface of said final document by use of said movable reading-out means.

36. A two-sided reading-out apparatus as defined in claim 26,
wherein, when said original document is thinner than predetermined paper and an image is formed only on the first surface of said original document, the conveying direction of the first surface of said original document to be piled on said original document piling means is designated; and
wherein said fixed reading-out means has a thinner paper mode of reading-out the first surface of said original document by use of said movable reading-out means.

37. A two-sided reading-out apparatus as defined in claim 26, further comprising:
page-number setting means for inputting and setting page numbers of said original document piled on said original document piling means;
wherein said paper conveyance controlling means accelerates paper conveyance such that, when a final document ends on an odd-numbered page of said original document with the two-side surfaces reading-out mode, a second surface of said final document is not read out, and a paper conveying speed in case of reading out a first surface of said original document by use of said movable reading-out means becomes higher than a paper conveying speed in case of reading out the second surface of said final document by use of said movable reading-out means.

38. A two-sided reading-out apparatus comprising:
an original document piling unit piling thereon plural sheets of an original document so as to put upside a first surface of said original document, above a contact glass;
a moving and reading-out unit moving and reading out said first surface of said original document conveyed onto a predetermined position on said contact glass from said original document piling unit and stopping thereon said conveyed original document on said contact glass;
a fixed reading-out unit conveying the original document and reading out a second surface of said original document, below said original document piling unit and above said contact glass;
a paper discharging unit discharging said original document conveyed through said fixed reading-out unit, below said original document piling unit and above said contact glass;
a paper conveying unit conveying said original document along a first conveying path from said original document piling unit to said contact glass and directing said conveyed original document from said contact glass to said paper discharging unit via said fixed reading-out unit and for further conveying said original document along a second conveying path formed on an inner side of said first conveying path;
a changing-over unit changing over a conveying direction of said original document to said first conveying path or to said second conveying path; and
a paper conveyance controlling unit conveying said original document piled on said original document piling unit onto said contact glass along said first conveying path by use of said paper conveying unit and thereafter changing over the conveying direction to said second conveying path and thereby inversely driving said paper conveying unit, and for conveying said original document from said contact glass to said paper discharging unit via said fixed reading-out unit.

39. A two-sided reading-out apparatus as defined in claim 38, further comprising:
a belt brought into contact with an upper surface of said contact glass for conveying said original document piled on said contact glass; and
a detection unit detecting passage of a rear end of said original document on said belt;
wherein said paper conveyance controlling unit controls paper conveyance such that, after reading out said first surface of the original document with a two-side surfaces reading-out mode, when said belt is rotated in a reverse direction and thereby said original document is conveyed from the upper side of said contact glass to said second conveying path, the conveying direction is changed over to said first conveying path by said changing-over unit when said detection unit detects the passage of the rear end of said original document on said belt, and said belt is positively rotated and accelerated at the same time, and a second document is conveyed onto said contact glass.

40. A two-sided reading-out apparatus as defined in claim 39,
having a mixed-designation optical magnification/reduction mode of piling original documents of different sizes on said original document piling unit.

41. A two-sided reading-out apparatus as defined in claim 40,
wherein said paper conveyance controlling unit performs a control operation, such that a paper conveying speed with a one-side surface reading-out mode by use of said fixed reading-out unit becomes higher than a paper conveying speed by use of said fixed reading-out unit with the two-side surfaces reading-out mode.

42. A two-sided reading-out apparatus as defined in claim 41, further comprising:
a page-number setting unit inputting and setting page numbers on each of said original documents piled on said original document piling unit;
wherein said paper conveyance controlling unit accelerates the paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

43. A two-sided reading-out apparatus as defined in claim 40, further comprising:
a page-number setting unit inputting and setting page numbers on each of said original documents piled on said original document piling unit;
wherein said paper conveyance controlling unit accelerates the paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

44. A two-sided reading-out apparatus as defined in claim 39, wherein said paper conveyance controlling unit performs a control operation, such that a paper conveying speed with a one-side surface reading-out mode by use of said fixed reading-out unit becomes higher than a paper conveying speed by use of said fixed reading-out unit in case of reading out said second surface of the original document with the two-side surfaces reading-out mode.

45. A two-sided reading-out apparatus as defined in claim 44, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

46. A two-sided reading-out apparatus as defined in claim 39, further comprising:

a page-number setting unit inputting and setting page numbers of said original document piled on said original document piling unit;

wherein said paper conveyance controlling unit accelerates the paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

47. A two-sided reading-out apparatus as defined in claim 38, having a mixed-designation optical magnification/reduction mode of piling original documents of different sizes on said original document piling unit.

48. A two-sided reading-out apparatus as defined in claim 47, wherein said paper conveyance controlling unit performs a control operation, such that a paper conveying speed with a one-side surface reading-out mode by use of said fixed reading-out unit becomes higher than a paper conveying speed by use of said fixed reading-out unit with a two-side surfaces reading-out mode.

49. A two-sided reading-out apparatus as defined in claim 48, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

50. A two-sided reading-out apparatus as defined in claim 47, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-sided reading-out mode, a second surface of said final document is not read out, and a paper conveying speed in case of reading out a first surface of said final document by use of said fixed reading out unit becomes higher than a paper conveying speed in case of reading out the second surface of said final document by use of said fixed reading-out unit.

51. A two-sided reading-out apparatus as defined in claim 38, wherein said paper conveyance controlling unit performs a control operation, such that a paper conveying speed with a one-side surface reading-out mode by use of said fixed reading-out unit becomes higher than a paper conveying speed by use of said fixed reading-out unit in case of reading out said second surface of the original document with a two-side surfaces reading-out mode.

52. A two-sided reading-out apparatus as defined in claim 51, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

53. A two-sided reading-out apparatus as defined in claim 38, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-sided reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

54. An image forming apparatus comprising a two-sided reading-out apparatus as defined in claim 38, having a mixed designation optical magnification/reduction mode in which original documents of different sizes are piled on said original document piling unit.

55. A two-sided reading-out apparatus comprising:

an original document piling unit piling thereon plural sheets of an original document so as to put upside a first surface of said original document, above a contact glass;

a fixed reading-out unit disposed on a position at a more downstream side in an original document conveying direction than that of said contact glass, above said contact glass and below said original document piling unit reading out a second surface of said original document at a time of conveying the original document;

a movable reading-out unit reading out said first surface of said original document conveyed from said original document piling unit onto a predetermined position of said contact glass and stopped thereon at a time of moving said original document on said contact glass;

a paper conveying unit conveying said original document along a paper conveying path extending from said original document piling unit to a position downstream of said fixed reading-out unit across said contact glass; and a paper conveyance controlling unit changing a preliminary conveying position for a second document and waiting temporarily with a one-side surface mode of reading out only one side surface of said original document and with a two-side surfaces mode of reading out both surfaces of said original document, before ending reading-out of the original document.

56. A two-sided reading-out apparatus as defined in claim 55, having a mixed-designation optical magnification/reduction mode of piling original documents of different sizes on said original document piling unit.

57. A two-sided reading-out apparatus as defined in claim 56, wherein said paper conveyance controlling unit performs a control operation, such that a paper conveying speed with the one-side surface reading-out mode by use of said fixed reading-out unit becomes higher than a paper conveying speed by use of said fixed reading-out unit with the two-side surfaces reading-out mode.

58. A two-sided reading-out apparatus as defined in claim 57, further comprising:

a page-number setting unit inputting and setting page numbers on each of said original documents piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

59. A two-sided reading-out apparatus as defined in claim 56, further comprising:

a page-number setting unit inputting and setting page numbers on each of said original documents piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

60. A two-sided reading-out apparatus as defined in claim 55, wherein said paper conveyance controlling unit performs a control operation, such that a paper conveying speed with the one-side surface reading-out mode by use of said fixed reading-out unit becomes higher than a paper conveying speed by use of said fixed reading-out unit in case of reading out said second surface of the original document with the two-side surfaces reading-out mode.

61. A two-sided reading-out apparatus as defined in claim 60, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

62. A two-sided reading-out apparatus as defined in claim 55, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

63. A two-sided reading-out apparatus comprising:

an original document piling unit piling thereon plural sheets of an original document so as to put upside a second surface of said original document, above a contact glass;

a fixed reading-out unit disposed on a position at a more upstream side in an original document conveying direction than that of said contact glass, above said contact glass and below said original document piling unit, reading out a first surface of said original document at a time of conveying the original document;

a movable reading-out unit reading out said second surface of said original document conveyed from said original document piling unit onto a predetermined position of said contact glass and stopped thereon at a time of moving said original document on said contact glass;

a paper conveying unit conveying said original document along a paper conveying path formed from said original document piling unit onto the contact glass through said fixed reading-out unit; and a paper conveyance controlling unit changing a preliminary conveying position for conveying a second document and waiting temporarily with a one-side surface mode of reading out only one side surface of said original document and with a two-side surfaces mode of reading out both surfaces of said original document before ending reading-out of the original document.

64. A two-sided reading-out apparatus as defined in claim 63, wherein said paper conveying path is structured such that a cross section thereof is formed in a shape of a Japanese letter "ヲ" (one-side opened rectangle), and a paper conveying direction at a time of separating said original document from said original document piling unit and feeding the original document to a subsequent stage becomes reverse to the paper conveying direction on said contact glass.

65. A two-sided reading-out apparatus as defined in claim 64, wherein said paper conveyance controlling unit performs a control operation such that, after said original document passes through said fixed reading-out unit with the two-side surfaces reading-out mode, a paper conveying speed is accelerated and said original document is conveyed onto said contact glass with a speed thus accelerated.

66. A two-sided reading-out apparatus as defined in claim 65, wherein, when said original document is thinner than predetermined paper and an image is formed only on the first surface of said original document, a conveying direction of the first surface of said original document to be piled on said original document piling unit is designated; and wherein said fixed reading-out unit has a thinner paper mode of reading-out the first surface of said original document by use of said movable reading-out unit.

67. A two-sided reading-out apparatus as defined in claim 65, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out unit becomes higher than a paper conveying speed in case of reading out the second surface of said final document by use of said movable reading-out unit.

68. A two-sided reading-out apparatus as defined in claim 64, wherein, when said original document is thinner than predetermined paper and an image is formed only on the first surface of said original document, a conveying direction of the first surface of said original document to be piled on said original document piling unit is designated; and wherein said fixed reading-out unit has a thinner paper mode of reading-out the first surface of said original document by use of said movable reading-out unit.

69. A two-sided reading-out apparatus as defined in claim 64, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out unit becomes higher than a paper conveying speed in case of reading out the second surface of said final document by use of said movable reading-out unit.

70. A two-sided reading-out apparatus as defined in claim 63, wherein said paper conveyance controlling unit performs a control operation such that, after said original document passes through said fixed reading-out unit with the two-side surfaces reading-out mode, a paper conveying speed is accelerated and said original document is conveyed onto said contact glass with a speed thus accelerated.

71. A two-sided reading-out apparatus as defined in claim 70, wherein, when said original document is thinner than predetermined paper and an image is formed only on the first surface of said original document, a conveying direction of the first surface of said original document to be piled on said original document piling unit is designated; and wherein said fixed reading-out unit has a thinner paper mode of reading-out the first surface of said original document by use of said movable reading-out unit.

72. A two-sided reading-out apparatus as defined in claim 70, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out unit becomes higher than a paper conveying speed in case of reading out the second surface of said final document by use of said movable reading-out unit.

73. A two-sided reading-out apparatus as defined in claim 63, wherein, when said original document is thinner than predetermined paper and an image is formed only on the first surface of said original document, a conveying direction of the first surface of said original document to be piled on said original document piling unit is designated; and wherein said fixed reading-out unit has a thinner paper mode of reading-out the first surface of said original document by use of said movable reading-out unit.

74. A two-sided reading-out apparatus as defined in claim 63, further comprising:

a page-number setting unit inputting and setting page numbers of said original document piled on said original document piling unit;

wherein said paper conveyance controlling unit accelerates paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out unit becomes higher than a paper conveying speed in case of reading out the second surface of said final document by use of said movable reading-out unit.

75. A method of reading out both surfaces of an original document, comprising the steps of:

piling, on an original document piling unit, plural sheets of said original document so as to put upside a first surface of said original document, above a contact glass;

moving and reading out said first surface of said original document onto a predetermined position on said contact glass from said original document piling unit;

stopping thereon said original document on said contact glass;

conveying the original document and reading the original document by use of a fixed reading-out unit;

reading out a second surface of said original document, below said original document piling unit and above said contact glass;

discharging said original document conveyed through said fixed reading-out unit, below said original document piling unit and above said contact glass;

conveying said original document along a first conveying path from said original piling unit to said contact glass;

directing said original document from said contact glass to a paper discharging unit via said fixed reading-out unit;

further conveying said original document along a second conveying path formed on an inner side of said first conveying path;

changing over a conveying direction of said original document to said first conveying path or to said second conveying path; and preparing a paper conveyance controlling unit for performing three steps:

conveying said original document piled on said original document piling unit onto said contact glass along said first conveying path by use of a paper conveying unit;

thereafter changing over the conveying direction to said second conveying path and thereby inversely driving said paper conveying unit; and conveying said original document from said contact glass to said paper discharging unit via said fixed reading-out unit.

76. A method of reading out both surfaces of an original document as defined in claim 75, further comprising the steps of:

conveying said original document piled on said contact glass by use of a paper conveying belt brought into contact with an upper surface of said contact glass; and detecting passage of a rear end of said original document on said paper conveying belt by use of a detection unit;

wherein said paper conveyance controlling unit controls paper conveyance such that, after reading out said first surface of the original document with a two-side surfaces reading-out mode, when said paper conveying belt is rotated in a reverse direction and thereby said original document is conveyed from the upper surface of said contact glass to said second conveying path, the conveying direction is changed over to said first conveying path by said changing-over unit when said detection unit detects the passage of the rear end of said original document on said paper conveying belt, and said paper conveying belt is positively rotated and accelerated at the same time, and a second document is conveyed onto said contact glass.

77. A method of reading out both surfaces of an original document, as defined in claim 75, wherein a two-side surfaces reading-out apparatus has a mixed-designation optical magnification/reduction mode of piling original documents of different sizes on said original document piling unit.

78. A method of reading out both surfaces of an original document, as defined in claim 75, wherein said paper conveyance controlling unit performs a control operation, such that a paper conveying speed with a one-side surface reading-out mode by use of said fixed reading-out unit becomes higher than a paper conveying speed by use of said fixed reading-out unit in case of reading out said second surface of the original document with a two-side surfaces reading-out mode.

79. A method of reading out both surfaces of an original document, as defined in claim 75, further comprising the step of:

inputting and setting page numbers of said original document piled on said original document piling unit by use of a page-number setting means, wherein said paper conveyance controlling unit accelerates paper conveyance such that, when a final document ends on an odd-numbered page of said original document with a two-sided reading-out mode, a second surface of said final document is not read out, and a paper conveying speed in case of reading out a first surface of said final document by use of said fixed reading-out unit becomes higher than a paper conveying speed in case of reading out the second surface of said final document by use of said fixed reading-out unit.

80. A method of reading out both surfaces of an original document, as defined in claim 75, wherein an image forming apparatus has a mixed designation optical magnification/reduction mode in which original documents of different sizes are piled on said original document piling unit, and utilizing the optical magnification/reduction mode, each of said original documents is read out with a reading-out magnification/reduction corresponding to a previously designated size of transferring paper.

81. A method of reading out both surfaces of an original document, comprising the steps of:

piling, on an original document piling unit, plural sheets of an original document so as to put upside a first surface of said original document, above a contact glass;

reading out a second surface of said original document at a time of conveying the original document by use of a fixed reading-out unit disposed on a position at a more downstream side in an original document conveying direction than that of said contact glass, above said contact glass and below said original document piling unit;

reading out said first surface of said original document conveyed from said original document piling unit onto a predetermined position of said contact glass and stopped thereon at the time of moving said original document on said contact glass by use of a movable reading-out unit;

conveying said original document along a paper conveying path extending from said original document piling unit to a downstream side of said fixed reading-out unit across said contact glass by use of a paper conveying unit; and preparing a paper conveyance controlling unit for performing three steps:
changing a preliminary conveying position;
conveying a second document; and
waiting temporarily with a one-side surface mode of reading out only one side surface of said original document and with a two-side surfaces mode of reading out both surfaces of said original document, before ending reading-out of the original document.

82. A method of reading out both surfaces of an original document, comprising the steps of:

piling, on an original document piling unit, plural sheets of an original document so as to put upside a second surface of said original document, above a contact glass;

reading out a first surface of said original document at a time of conveying the original document by use of a fixed reading-out unit disposed on a position at a more upstream side in an original document conveying direction than that of said contact glass, above said contact glass and below said original document piling unit;

reading out said second surface of said original document conveyed from said original document piling unit onto a predetermined position of said contact glass and stopped thereon at a time of moving said original document on said contact glass by use of a movable reading out unit;

conveying said original document along a paper conveying path formed from said original document piling unit across the contact glass through the fixed reading-out unit; and changing a preliminary conveying position for conveying a second document and waiting temporarily with a one-side surface mode of reading out only one side surface of said original document and with a two-side surfaces mode of reading out both surfaces of said original document, before ending reading-out of the original document.

83. A method of reading out both surfaces of an original document, as defined in claim 82, wherein said paper conveying path is structured such that a cross section thereof is formed in a shape of a Japanese letter "ヲ" (one-side opened rectangle), and the original document conveying direction at a time of separating said original document from said original document piling unit and feeding the original document to a subsequent stage becomes reverse to the original document conveying direction on said contact glass.

84. A method of reading out both surfaces of an original document, as defined in claim 82, wherein a paper conveyance controlling unit performs a control operation such that, after said original document passes through said fixed reading-out unit with the two-side surfaces reading-out mode, a paper conveying speed is accelerated and said original document is conveyed onto said contact glass with a speed thus accelerated.

85. A method of reading out both surfaces of an original document, as defined in claim 82, wherein, when said original document is thinner than predetermined paper and an image is formed only on the first surface of said original document, a conveying direction of the first surface of said original document to be piled on said original document piling unit is designated; and wherein said fixed reading-out unit has a thinner paper mode of reading-out the first surface of said original document by use of said movable reading-out unit.

86. A method of reading out both surfaces of an original document, as defined in claim 82, further comprising the step of:

inputting and setting page numbers of said original document piled on said original document piling unit by use of a page-number setting unit;

wherein a paper conveyance controlling unit accelerates a paper conveyance such that, when a final document ends on an odd-numbered page of said original document with the two-side surfaces reading-out mode, a second surface of said final document is not read out, and a paper conveying speed in case of reading out a first surface of said final document by use of said movable reading-out unit becomes higher than a paper conveying speed in case of reading out the second surface of said final document by use of said movable reading-out unit.

* * * * *

UNITED STATES PATENT AND TRADEMARK OFFICE
CERTIFICATE OF CORRECTION

PATENT NO. : 6,285,853 B1
DATED : September 4, 2001
INVENTOR(S) : Sano

It is certified that error appears in the above-identified patent and that said Letters Patent is hereby corrected as shown below:

<u>Title page,</u>
Item [30], the Foreign Application Application Priority information should read:
-- [30]    Foreign Application Priority Data

Apr. 15, 1999   (JP) ................................11-107354
Mar. 15, 2000   (JP) ................................12-072653 --

Signed and Sealed this

Fourteenth Day of May, 2002

Attest:

JAMES E. ROGAN
*Attesting Officer*       *Director of the United States Patent and Trademark Office*